(12) United States Patent
Yagi et al.

(10) Patent No.: US 7,568,257 B2
(45) Date of Patent: Aug. 4, 2009

(54) CLUTCH DEVICE, MOTOR APPARATUS AND WIPER SYSTEM

(75) Inventors: Hideyuki Yagi, Toyohashi (JP); Takayuki Imamura, Hamamatsu (JP)

(73) Assignee: ASMO Co., Ltd., Shizuoka-pref. (JP)

( * ) Notice: Subject to any disclaimer, the term of this patent is extended or adjusted under 35 U.S.C. 154(b) by 819 days.

(21) Appl. No.: 10/978,560

(22) Filed: Nov. 2, 2004

(65) Prior Publication Data

US 2005/0097698 A1    May 12, 2005

(30) Foreign Application Priority Data

Nov. 7, 2003  (JP) ............... 2003-378502
Aug. 9, 2004  (JP) ............... 2004-232554

(51) Int. Cl.
*B60S 1/06* (2006.01)
(52) U.S. Cl. .............. 15/250.3; 15/250.31; 74/425; 192/148
(58) Field of Classification Search ............. 15/250.3, 15/250.31, 250.19; 74/425; 192/139, 148
See application file for complete search history.

(56) References Cited

U.S. PATENT DOCUMENTS

| | | | |
|---|---|---|---|
| 4,774,423 A | 9/1988 | Karasawa et al. | |
| 4,928,802 A | 5/1990 | Weiss et al. | |
| 4,991,903 A | 2/1991 | Okabe et al. | |
| 5,090,261 A | 2/1992 | Nakatsukasa | |
| 5,212,999 A | 5/1993 | Kitada | |
| 5,566,577 A | 10/1996 | Klar | |
| 5,655,405 A | 8/1997 | Lerouge et al. | |
| 5,848,553 A * | 12/1998 | Miyazaki | 74/42 |
| 5,855,140 A | 1/1999 | Imamura | |
| 5,907,885 A * | 6/1999 | Tilli et al. | 15/250.16 |
| 5,979,256 A * | 11/1999 | Kilker et al. | 74/89.16 |
| 6,003,193 A | 12/1999 | Rivin et al. | |
| 6,026,536 A * | 2/2000 | Miller et al. | 15/250.31 |
| 6,070,697 A | 6/2000 | Millard | |
| 6,116,110 A * | 9/2000 | Maue et al. | 74/471 R |
| 6,205,612 B1 | 3/2001 | Tilli et al. | |
| 6,449,798 B1 * | 9/2002 | Rivin et al. | 15/250.3 |

(Continued)

FOREIGN PATENT DOCUMENTS

DE    197 56 157    4/1999

(Continued)

OTHER PUBLICATIONS

Office Communication dated Feb. 15, 2008 in corresponding European Patent Application No. 05 024 565.3-2424.

(Continued)

*Primary Examiner*—Lee D Wilson
(74) *Attorney, Agent, or Firm*—Posz Law Group, PLC

(57) ABSTRACT

Initiation of coupling between an input disk and a clutch disk at a maximum rotational coupling force without making relative rotation between the input disk and the clutch disk is enabled only when the output shaft is placed in a single engageable point within a normal reciprocal angular range of the output shaft. When a load applied to the output shaft is equal to or greater than a predetermined value, the input disk and the clutch disk are decoupled from one another, so that the relative rotation is made between the input disk and the clutch disk.

16 Claims, 23 Drawing Sheets

U.S. PATENT DOCUMENTS

| | | | |
|---|---|---|---|
| 6,493,900 | B1 | 12/2002 | Koumo et al. |
| 6,611,987 | B1 | 9/2003 | Nakazato et al. |
| 2005/0097698 | A1* | 5/2005 | Yagi et al. .................. 15/250.3 |
| 2005/0097699 | A1* | 5/2005 | Yagi et al. .................. 15/250.3 |
| 2006/0059646 | A1 | 3/2006 | Bendo |
| 2006/0101603 | A1 | 5/2006 | Yagi |
| 2006/0117514 | A1 | 6/2006 | Yagi et al. |

FOREIGN PATENT DOCUMENTS

| | | |
|---|---|---|
| EP | 0 904 983 | 3/1999 |
| GB | 1 580 926 | 12/1980 |
| JP | A-S64-44367 | 2/1989 |
| JP | U-5-3654 | 1/1993 |
| JP | A-9-118202 | 5/1997 |
| JP | A-11-348737 | 12/1999 |
| JP | A-2001-138873 | 5/2001 |
| JP | B2-3550049 | 4/2004 |
| WO | WO 98/45149 | 10/1998 |
| WO | WO 99/19184 | 4/1999 |

OTHER PUBLICATIONS

Extended Search Report issued from European Patent Office issued on Feb. 20, 2006 for the corresponding European patent application No. 05024565.3-2424 (a copy and English translation thereof).

European communication dated Jun. 26, 2007 issued in the corresponding European Application No. 04 026 323.8.

Office Communication issued from European Patent Office issued on Nov. 28, 2005 for the corresponding European patent application No. 2004026323.8 (a copy thereof).

Office Action dated Nov. 2, 2007 in corresponding Chinese Patent Application No. 200410088332.6 (and English Translation).

Office Action dated Dec. 14, 2007 in corresponding European Patent Application No. 04 026 322.0.

Office Action dated May 1, 2008 in related U.S. Appl. No. 10/978,561.

Office Action dated Oct. 28, 2008 in corresponding Japanese patent application No. 2004-232554 (and English translation).

Office Action dated Oct. 21, 2008 in corresponding Japanese patent application No. 2004-232555 (and English translation).

Office Action dated Nov. 10, 2008 in corresponding U.S. Appl. No. 10/978,561.

Office Action dated Dec. 16, 2008 in corresponding EPC Appplication No. 04 026 322.0 (and English Translation).

Office Action dated Mar. 17, 2009 in related patent U.S. Appl. No. 11/265,146.

Chinese Office Action dated Sep. 7, 2007 in corresponding Chinese Patent Application No. 200410092293.7 (and English Translation).

Office Action dated Apr. 2, 2009 in related U.S. Appl. No. 10/978,561.

Office action dated Apr. 2, 2009 in related U.S. Appl. No. 10/978,561.

Notice of Allowance dated Apr. 8, 2009 in related U.S. Appl. No. 10/978,560.

Office Action dated Mar. 3, 2009 in corresponding Japanese patent application No. 2004-342182 (and English translation).

* cited by examiner

CLUTCH DEVICE, MOTOR APPARATUS AND WIPER SYSTEM

CROSS REFERENCE TO RELATED APPLICATION

This application is based on and incorporates herein by reference Japanese Patent Application No. 2003-378502 filed on Nov. 7, 2003 and Japanese Patent Application No. 2004-232554 filed on Aug. 9, 2004. This application is also related to U.S. application Ser. No. 10/978,561, entitled "OUTPUT SHAFT ASSEMBLY, MOTOR APPARATUS AND WIPER MOTOR APPARATUS," filed on Nov. 2, 2004 and U.S. application Ser. No. 11/265,146, entitled "MOTOR APPARATUS," filed on Nov. 3, 2005.

BACKGROUND OF THE INVENTION

1. Field of the Invention

The present invention relates to a clutch device, a motor apparatus and a wiper system.

2. Description of Related Art

For example, a wiper system, which wipes a window glass of a vehicle, has a motor apparatus as its drive source.

The wiper motor apparatus, particularly a rear wiper motor apparatus, includes a worm wheel, a swing arm and a joint member. The worm wheel is meshed with a rotatable shaft of an armature, which is rotatably supported by a case. The swing arm is connected to a wiper shaft. One end of the joint member is connected to a predetermined point of the worm wheel, and the other end of the joint member is connected to the swing arm. Upon energization of the wiper motor apparatus, the armature is rotated to rotate the worm wheel. Then, the rotation of the worm wheel is converted to a swing motion of the swing arm through the joint member to reciprocally rotate the wiper shaft. Therefore, a wiper arm, which is directly installed to the wiper shaft, is swung to wipe a rear glass of the vehicle. One such wiper motor apparatus is disclosed in Japanese Unexamined Patent Publication No. H09-118202.

In the non-operating state of the wiper where a wiper blade connected to the wiper arm is stopped and is thus held substantially parallel to a lower edge of the glass surface, when an external force, which is exerted by, for example, heavy snow, is applied to the wiper blade and the wiper arm, the wiper blade and the wiper arm are pressed downward beyond a lower turning point. At this time, the wiper shaft and the swing arm of the wiper motor apparatus are rotated further beyond a normal reciprocal rotational angular range. Therefore, the joint member, which is connected to the swing arm, or the worm wheel, which is connected to the joint member, could be damaged by the external force.

Thus, to limit the damage of the above components and to limit rotation of the wiper arm into a vehicle body region beyond the window glass area of the vehicle, in the wiper motor apparatus disclosed in Japanese Unexamined Patent Publication No. H09-118202, a rotational range limiting portion is provided at a location, which is outside of the normal reciprocal rotational angular range of the swing arm to limit the rotation of the swing arm beyond the predetermined reciprocal rotational angular range of the swing arm.

However, an excessively large external force could be applied to, for example, the wiper blade and the wiper arm even in a case where the wiper blade and the wiper arm are not placed outside of the predetermined reciprocal rotational angular range. In other words, the excessively large external force could be applied to, for example, the wiper blade and the wiper arm even in the case where the wiper blade and the wiper arm are operated within the predetermined reciprocal rotational angular range (a normal wiping range). This could be a case where heavy snow, which has been accumulated on a roof of the vehicle, falls onto the wiper blade and the wiper arm, which is operated and is located in the normal wiping range other than the lower turning point. In such a case, the wiper blade and the wiper arm are arrested by the fallen heavy snow or receive an excessively large external force from the fallen snow. Therefore, the excessively large external force is applied to the swing arm, the joint member, the worm wheel and/or the worm gear through the wiper shaft, so that these components could be damaged by the excessively large external force. Thus, the above-described disadvantage still exists.

Therefore, in the case of the wiper motor apparatus described in Japanese Unexamined Patent Publication No. H09-118202, each corresponding component of the wiper motor apparatus needs to be designed to withstand the above described excessively large external force.

It has been proposed to provide a frictional clutch mechanism to an output shaft (the wiper shaft) to limit damage to the corresponding component of the wiper motor apparatus, such as the worm wheel, or to limit burnout of the wiper motor apparatus even at the time of application of the excessively large external force. However, such a frictional clutch mechanism significantly disadvantageously reduces a transmission efficiency of the rotational force. Furthermore, a noise could be disadvantageously generated through frictional slide movement of the clutch. Also, an activation point of the frictional clutch mechanism is largely depend on the frictional force of the frictional clutch mechanism, so that the activation point of the frictional clutch mechanism may vary from product to product.

To address the above disadvantage, it is conceivable to provide a clutch, which is operated through meshed engagement, to the output shaft to protect the entire structure of the wiper motor apparatus including the swing mechanism, the speed reducing mechanism and the motor main body at the time of application of the excessively large external force during the operation of the wiper blade and the wiper arm in the normal rotational angular range (in the normal wiping operation). In this type of clutch, which is operated through the meshed engagement, it is possible to limit damage to the corresponding component of the wiper motor apparatus and to limit burnout of the wiper motor apparatus at the time of locking the output shaft. Also, the loss of the rotational force by the sliding movement is small, so that the transmission efficiency of the rotational force is increased. In addition, the generation of the noise is limited.

However, in the case of the clutch, which is operated through the meshed engagement, when an excessively large external force (an excessively large load) is applied to the clutch, the meshed engagement is released. When the meshed engagement of the clutch is released, relative rotation occurs between the output shaft (the driven side component) and the worm wheel (the driving side component or the motor side component). Thus, for example, in a case where the wiping position of the wiper arm, which is secured to the output shaft, is controlled by an automatic stop device, which is provided to the worm wheel (the driving side component or the motor side component) to automatically stop the wiper arm at a predetermined stop position, when the excessively large external force is applied to the clutch to cause the release of the meshed engagement, the predetermined stop position of the wiper arm is displaced. Thus, the wiper arm cannot be automatically stopped at the predetermined stop position.

SUMMARY OF THE INVENTION

The present invention addresses the above disadvantages. Thus, it is an objective of the present invention to provide a clutch device, a motor apparatus and a wiper system, which can limit damage to its component and burnout of the motor apparatus and which can automatically return the clutch device to its initial position by operating a motor side component (a driving side component) to reconnect an output shaft (a driven side component) to the motor side component (the driving side component) at a predetermined point to perform a normal operation even when relative rotation occurs between the output shaft (the driven side component) and the motor side component (the driving side component).

To address the objective of the present invention, there is provided a clutch device, which includes a first rotatable member, a second rotatable member, an output shaft and at least one rotation limiter. The first rotatable member is reciprocally rotated by a drive force applied thereto. The second rotatable member is coupleable with the first rotatable member at a maximum rotational coupling force to rotate integrally with the first rotatable member without making relative rotation between the first rotatable member and the second rotatable member at the time of reciprocally rotating the first rotatable member. The output shaft is connected to the second rotatable member to rotate integrally with the second rotatable member. The output shaft is normally rotatable within a predetermined normal reciprocal rotational angular range. The at least one rotation limiter limits reciprocal rotation of the output shaft beyond a limited angular range, which is larger than the normal reciprocal rotational angular range of the output shaft. Initiation of the coupling between the first rotatable member and the second rotatable member at the maximum rotational coupling force without making the relative rotation between the first rotatable member and the second rotatable member is enabled only when the output shaft is placed in a single engageable point within the normal reciprocal angular range of the output shaft. When a load applied to the output shaft is equal to or greater than a predetermined value, the first rotatable member and the second rotatable member are decoupled from one another, so that the relative rotation is made between the first rotatable member and the second rotatable member.

To achieve the objective of the present invention, there is also provided a motor apparatus, which includes the above clutch device, a housing and a motor main body. The housing receives the clutch device. The motor main body is connected to the clutch device to supply the drive force to the first rotatable member of the clutch device.

To achieve the objective of the present invention, there is also provided a wiper system, which includes the above clutch device, a housing, a wiper and a motor main body. The housing receives the clutch device. The wiper is directly or indirectly connected to the output shaft of the clutch device and is reciprocally swung at the time of reciprocally rotating the output shaft. The motor main body is connected to the clutch device to supply the drive force to the first rotatable member of the clutch device.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

First Embodiment

Figure 1:
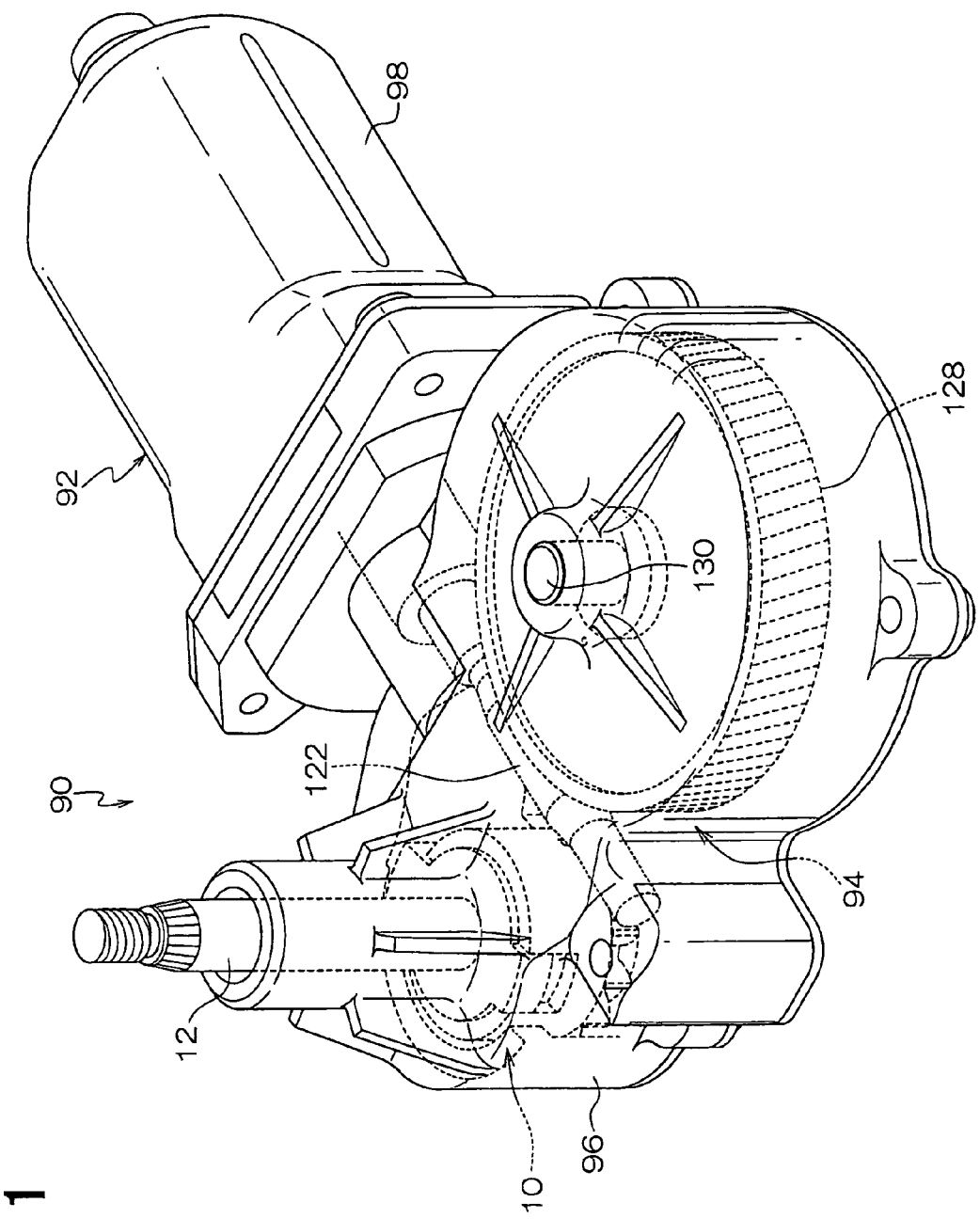
FIG. 1 is a perspective view showing a wiper motor apparatus and a clutch device according to a first embodiment of the present invention.
Figure 2:
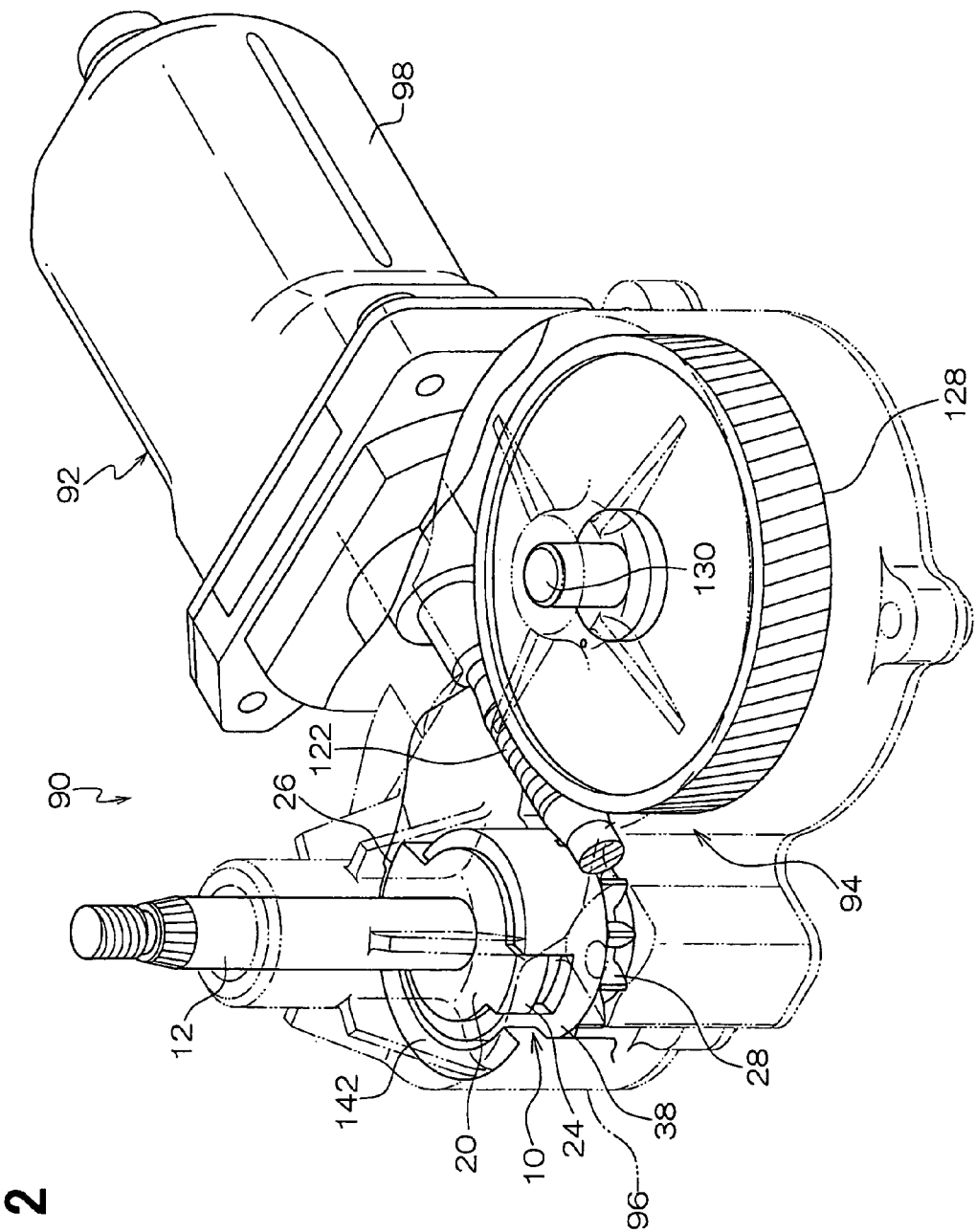
FIG. 2 is a perspective view transilluminating a portion of the wiper motor apparatus and the clutch device of the first embodiment of the present invention.
Figure 3:
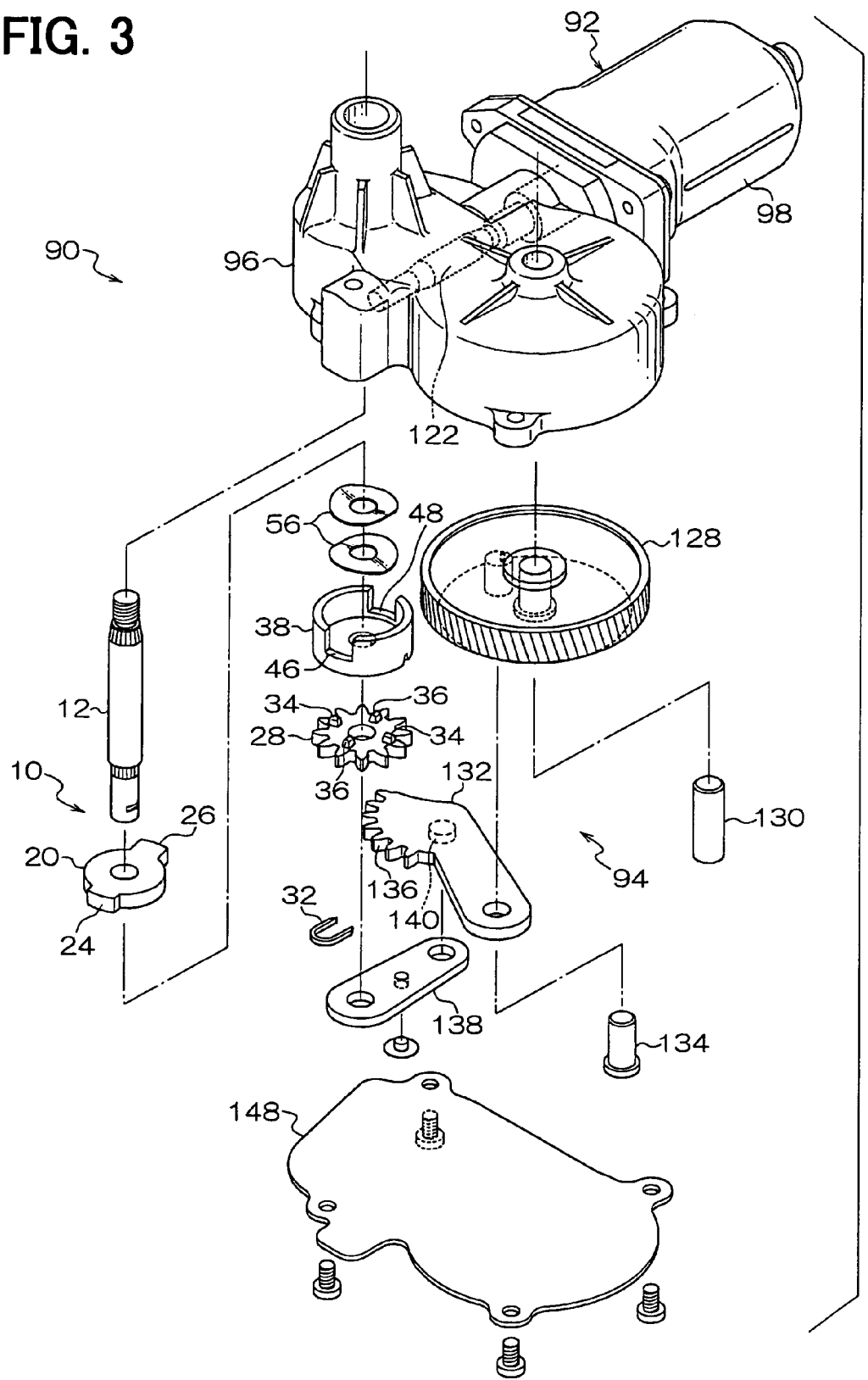
FIG. 3 is an exploded perspective view showing the wiper motor apparatus and the clutch device of the first embodiment of the present invention.
Figure 4:
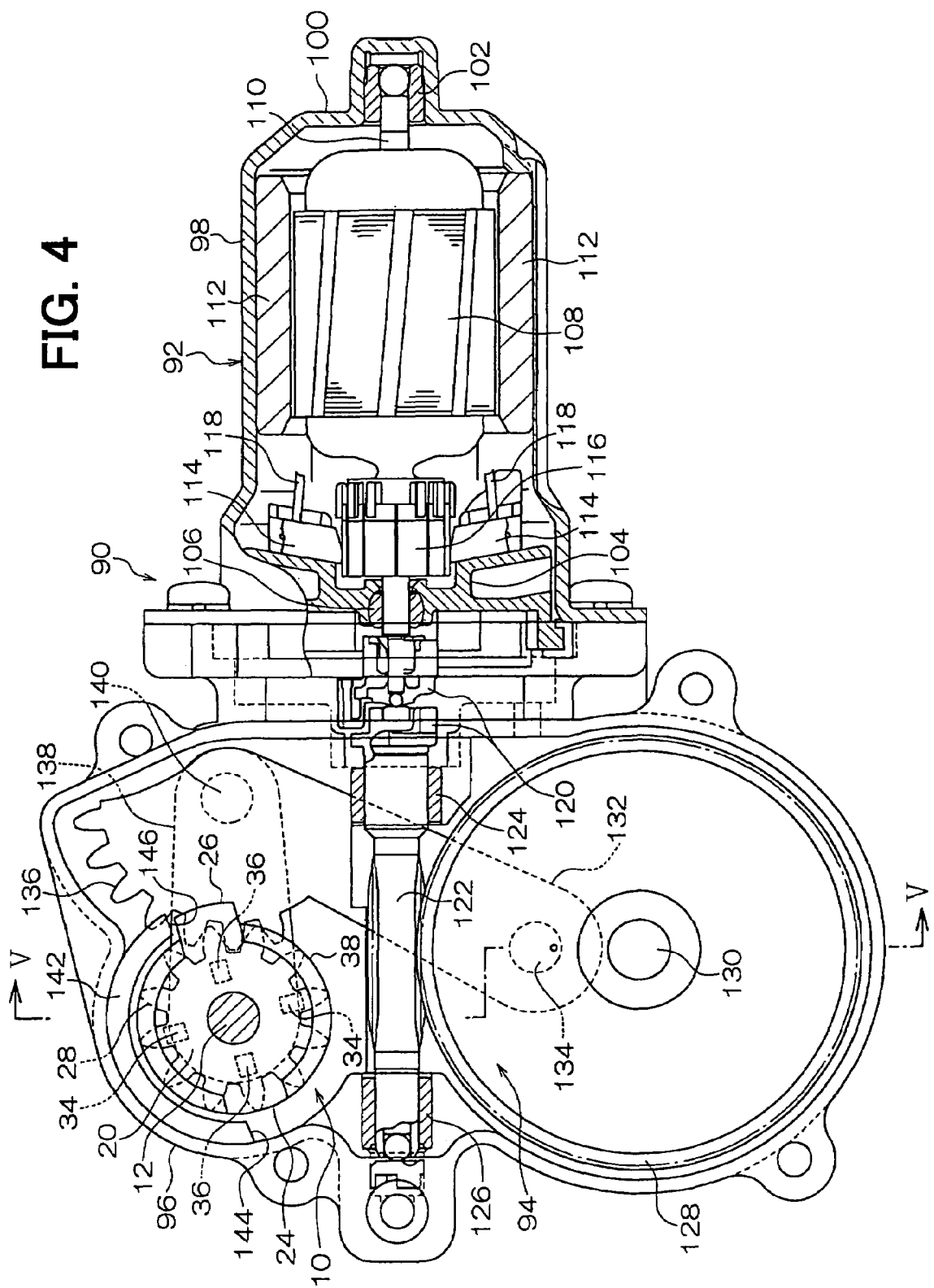
FIG. 4 is a plan cross sectional view showing a structure of the wiper motor apparatus of the first embodiment of the present invention.

FIGS. 1 and 2 are perspective views of an entire wiper motor apparatus 90, in which a clutch device 10 of a first embodiment of the present invention is installed. The wiper motor apparatus 90 is formed as a wiper drive motor apparatus for driving a wiper system of a vehicle and includes a clutch device 10, a motor main body 92 and a motion converting mechanism (also referred to as a swing mechanism) 94.

The clutch device 10 includes an output shaft 12. A base end portion (a rear end portion) of the output shaft 12 includes a rotation restraining portion 14, a removal limiting portion 16 and a relatively rotatable shaft portion 18. The rotation restraining portion 14 includes a plurality of axial ridges 14a. The removal limiting portion 16 is formed in a rear end of the rear end portion of the output shaft 12. The relatively rotatable shaft portion 18 is arranged between the rotation restraining portion 14 and the removal limiting portion 16.

A clutch base (a base member) 20 is secured to the rotation restraining portion 14 of the output shaft 12 by, for example, press fitting. The clutch base 20 is formed as a disk body and has a support hole 22 in its center. The support hole 22 is secured to the rotation restraining portion 14, so that the clutch base 20 rotates integrally with the output shaft 12. Furthermore, two fitting male portions 24, 26 are provided in an outer peripheral part of the clutch base 20 in such a manner that the fitting male portions 24, 26 are opposed to one another in a circumferential direction of the clutch base 20, i.e., are displaced 180 degrees from one another in the circumferential direction of the clutch base 20 and protrude in a radial direction of the output shaft 12. A radial extent of the fitting male portion 26 is larger than a radial extent of the fitting male portion 24. The fitting male portions 24, 26 correspond to a clutch disk 38, which will be described later.

An input disk (a first rotatable member) 28 is installed to the removal limiting portion 16 of the output shaft 12. The input disk 28 is formed as a gear body or a gear member and has a shaft hole 30 in its center. The removal limiting portion 16 of the output shaft 12 is received through the shaft hole 30, and a removal limiting clip 32 is installed to the removal limiting portion 16 to limit removal of the input disk 28 from the output shaft 12. Thus, the input disk 28 is coaxial with the output shaft 12 and is supported by the output shaft 12 at one axial end side (the end side opposite from the clutch base 20) of the output shaft 12 in such a manner that the input disk 28 is non-detachable from the output shaft 12 in an axial direction of the output shaft 12 and is rotatable relative to the output shaft 12. When a drive force is inputted to the input disk 28, the input disk 28 is rotated about the axis of the output shaft 12. Two pairs (first and second pairs) of mating male portions (first side mating portions) 34, 36 protrude from an end surface of the input disk 28 (a clutch base 20 side, i.e., the other axial end side of the output shaft 12) toward the clutch base 20.

The mating male portions (the mating male portions of the first pair) 34 of one of the two pairs of the mating male portions 34, 36 are opposed to one another in the circumferential direction, i.e., are displaced 180 degrees from one another in the circumferential direction. Furthermore, the mating male portions (the mating male portions of the second pair) 36 of the other one of the two pairs of the mating male portions 34, 36 are opposed to one another in the circumferential direction, i.e., are displaced 180 degrees from one another in the circumferential direction. Furthermore, the mating male portions 34 and the mating male portions 36 are arranged one after another at equal intervals (90 degree intervals in the circumferential direction) The mating male portions 34 of the one of the two pairs of mating male portions 34, 36 are located outward beyond the mating male portions 36 of the other one of the two pairs of mating male portions 34, 36 in a radial direction of the input disk 28 and extend into the teeth of the input disk 28. The two pairs of mating male portions 34, 36 also correspond to the clutch disk 38, which will be described later.

The clutch disk (a second rotatable member) 38 is supported by the relatively rotatable shaft portion 18 of the output shaft 12. The clutch disk 38 is formed into a cup shape and thus includes a base wall 42 and a peripheral wall 44. A shaft hole 40, which corresponds to the output shaft 12, is formed through the base wall 42. The peripheral wall 44 extends from an outer peripheral edge of the base wall 42 in the axial direction of the output shaft 12. When the output shaft 12 (more specifically, the relatively rotatable shaft portion 18) is received through the shaft hole 40, the clutch disk 38 is coaxial with the output shaft 12 and also with the input disk 28 and is located on the other axial end side of the output shaft 12 (the clutch base 20 side) with respect to the input disk 28 and is axially movably supported by the output shaft 12 in the axial direction of the output shaft 12.

Fitting female guide portions 46, 48 are provided in an opening side peripheral part of the peripheral wall 44 to correspond with the fitting male portions 24, 26 of the clutch base 20. The fitting male portions 24, 26 of the clutch base 20 are fitted into the fitting female guide portions 46, 48, respectively, of the peripheral wall 44 in the axial direction of the output shaft 12 in a manner that allows relative movement between the fitting male portions 24, 26 of the clutch base 20 and the fitting female guide portions 46, 48 in the axial direction of the output shaft 12. In this way, the clutch disk 38 rotates together with the clutch base 20 (i.e., the output shaft 12) and is movable relative to the clutch base 20 in the axial direction of the output shaft 12.

Two pairs of mating female portions (second side mating portions) 50, 52 are recessed in a back surface of the base wall 42 of the clutch disk 38 (an input disk 28 side, i.e., the one axial end side of the output shaft 12).

The mating female portions 50, 52 correspond to the mating male portions 34, 36, respectively, of the input disk 28. The mating female portions (the mating female portions of the first pair) 50 of one of the two pairs of the mating female portions 50, 52 are opposed to one another in the circumferential direction, i.e., are displaced 180 degrees from one another in the circumferential direction. Also, the mating female portions (the mating female portions of the second pair) 52 of the other one of the two pairs of the mating female portions 50, 52 are opposed to one another in the circumferential direction, i.e., are displaced 180 degrees from one another in the circumferential direction. Furthermore, the mating female portions 50 and the mating female portions 52 are arranged at equal intervals (i.e., 90 degree intervals in the circumferential direction). The mating male portions 34 of the input disk 28 can engage the mating female portions 50 of the clutch disk 38, and the mating male portions 36 of the input disk 28 can engage the mating female portions 52 of the clutch disk 38. In this way, when the input disk 28 is rotated, a rotational force of the input disk 28 is transmitted to the clutch disk 38, so that the clutch disk 38 is rotated together with the input disk 28. Furthermore, as will be described later, each of the mating male portions 34, 36 of the input disk 28 can engage the corresponding one the mating female portions 50, 52 of the clutch disk 38 only at a predetermined single engageable point in a normal reciprocal rotational angular range X of the output shaft 12 (FIGS. 14-18), which is about 170 degrees in the present case. In other words, each mating male portion 34 engages none of the mating female portion 52, and each mating male portion 36 engages none of the mating female portions 50.

Lateral walls 34a, 36a of the mating male portions 34, 36 of the input disk 28 and lateral walls 50a, 52a of the mating female portions 50, 52 of the clutch disk 38 have slant surfaces. In other words, each of the mating male portions 34, 36 has a trapezoidal cross section, and each of the mating female portions 50, 52 has a corresponding trapezoidal cross section. In this way, when the input disk 28 is rotated, a rotational force is transmitted from the input disk 28 to the clutch disk 38, and thus a force component is generated in the clutch disk 38 in the axial direction of the output shaft 12 toward the clutch base 20.

It should be understood that all of the lateral walls 34a, 36a of the mating male portions 34, 36 of the input disk 28 and the lateral walls 50a, 52a of the mating female portions 50, 52 of the clutch disk 28 do not need to have the slant surfaces described above. For example, only one of the lateral walls 34a, 36a of each of the mating male portions 34, 36 can be made as the slant surface, which is slanted in the circumferential direction or is slanted relative to the circumferential direction. Also, only one of the lateral walls 50a, 52a of each of the mating female portions 50, 52 can be made as the slant surface, which is slanted in the circumferential direction or is slanted relative to the circumferential direction. Even with this structure, the force component can be generated in the clutch disk 38 in the axial direction of the output shaft 12 toward the clutch base 20 upon transmission of the rotational force from the input disk 28 to the clutch disk 38.

Furthermore, an interior of the clutch disk 38, i.e., an inner space defined by the base wall 42 and the peripheral wall 44 forms a receiving portion 54. The clutch base 20 is fitted to the opening side peripheral part of the peripheral wall 44 of the clutch disk 38 in such a manner that the clutch base 20 closes the receiving portion 54.

The receiving portion 54 receives a plurality (two in the present embodiment) of wave washers 56, which serve as resilient members of the present invention. The wave washers 56 are arranged between the clutch disk 38 (the base wall 42) and the clutch base 20. Furthermore, the wave washers 56 apply a predetermined resistive force (a restoring force generated upon resilient deformation of the wave washers 56 due to the axial movement of the clutch disk 38) against the axial movement of the clutch disk 38 toward the other output shaft 12 axial end side (the clutch base 20 side) from the engaged state, at which the mating male portions 34, 36 of the input disk 28 and the mating female portions 50, 52 of the clutch disk 38 are engaged with one another to rotate together. In other words, in the normal operation, the mating male portions 34, 36 of the input disk 28 are engaged with, i.e., are received in the mating female portions 50, 52 of the clutch disk 38, and the wave washers 56 maintain the engaged state between the mating male portions 34, 36 of the input disk 28 and the mating female portions 50, 52 of the clutch disk 38. When the mating male portions 34, 36 of the input disk 28 try to disengage from the mating female portions 50, 52 of the clutch disk 38, the clutch disk 38 tries to move axially toward the clutch base 20, and the wave washers 56 exert the urging force (the restoring force) against the axial movement of the clutch disk 38.

In the normal operation (i.e., in the state where the clutch disk 38 does not try to move axially toward the clutch base 20), the wave washers 56 may always exert an appropriate urging force between the clutch base 20 and the clutch disk 38. Alternatively, the wave washers 56 may exert the above urging force (the restoring force) only when the clutch disk 38 tries to move toward the clutch base 20, i.e., only when the mating male portions 34, 36 try to disengage from the mating female portions 50, 52.

The clutch device 10, which has the above structure, is received in the housing 96, and the output shaft 12 projects outwardly from the housing 96.

Furthermore, a stopper projection 142 is formed in the housing 96 to correspond with the fitting male portion 26, which projects longer in the radial direction in comparison to the fitting male portion 24 in the clutch base 20 of the clutch device 10.

The stopper projection 142 is formed as an arcuate body and is located in a rotational moving path of the fitting male portion 26, along which the fitting male portion 26 moves during the rotation of the clutch base 20. One circumferential end of the stopper projection 142 forms a rotation limiter 144, and the other circumferential end of the stopper projection 142 forms a rotation limiter 146. That is, each of the rotation limiters 144, 146 of the stopper projection 142 can engage the fitting male portion 26. When the fitting male portion 26 engages the rotation limiter 144 or the rotation limiter 146 of the stopper projection 142, further rotation of the clutch base 20 is limited. Thus, at the time of rotating the clutch base 20 (the output shaft 12) together with the clutch disk 38 through application of the rotational drive force of the input disk 28 to the clutch base 20, when the fitting male portion 26 engages the rotation limiter 144 or the rotation limiter 146 of the stopper projection 142, the further rotation of the clutch base 20 (the output shaft 12) is forcefully limited. Thus, relative rotation between the input disk 28 and the clutch base 20 (the output shaft 12) occurs.

A rotational angular range of the fitting male portion 26 (i.e., a rotational angular range of the output shaft 12) between the rotation limiter 144 and the rotation limiter 146 of the stopper projection 142 is set as a limited angular range Y. More specifically, the limited angular range Y is set to be larger or wider than the normal reciprocal rotational angular range X of the output shaft 12 (of the clutch base 20 and of the clutch disk 30). In the present embodiment, the limited angular range Y is set to be 180 degrees.

Figure 13:
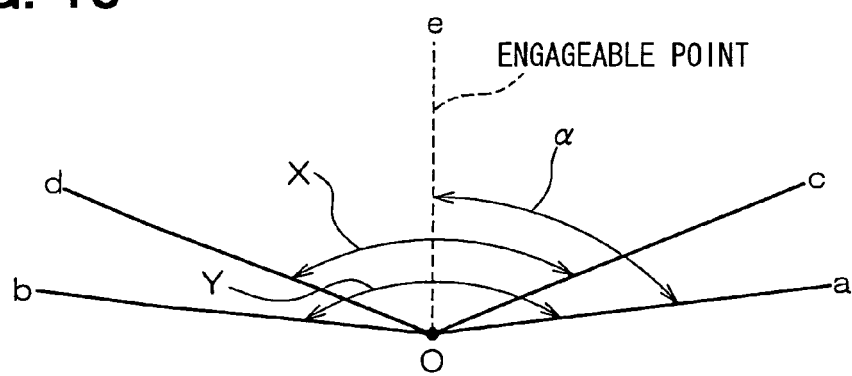
FIG. 13 is a schematic view for describing angular settings for automatically resetting the clutch device of the wiper motor apparatus of the first embodiment of the present invention to its initial position.

As discussed above, the mating male portions 34 are located beyond the mating male portions 36 in the radial direction of the input disk 28. Thus, the mating male portions 34 do not engage the mating female portions 52, which correspond to the mating male portions 36. Similarly, the mating male portions 36 do not engage the mating female portions 50, which correspond to the mating male portions 34. Furthermore, the mating male portions 34 are opposed to one another in the circumferential direction of the input disk 28, and the mating male portions 36 are opposed to one another in the circumferential direction of the input disk 28. Thus, when the limited angular range Y, which is larger than the normal reciprocal rotational angular range X of the output shaft 12, is set to be about 180 degrees, each of the mating male portions 34, 36 of the input disk 28 can only engage the corresponding one of the mating female portions 50, 52 of the clutch disk 38 at the predetermined single engageable point in the normal reciprocal rotational angular range X of the output shaft 12. That is, as schematically shown in FIG. 13, this predetermined single engageable point, which is set within the normal reciprocal rotational angular range X, is located within a corresponding angular range, which starts from at least one of the circumferential ends a, b of the limited angular range Y and has an angular extent that is equal to the normal reciprocal rotational angle ∠doc of the output shaft 12. More specifically, an angle ∠α between the engageable point e and the end a or the end b of the limited angular range Y is set to be smaller than the reciprocal rotational angle ∠doc of the output shaft 12. Therefore, initiation of the coupling between the input disk 28 and the clutch disk 38 at the maximum rotational coupling force without making the relative rotation between the input disk 28 and the clutch disk 38 through the engagement between the mating male portions 34, 36 of the input disk 28 and the mating female portions 50, 52 of the clutch disk 38 is enabled only when the output shaft 12 is placed in the single engageable point e within the normal reciprocal angular range X of the output shaft 12.

Furthermore, as discussed above, when the mating male portions 34, 36 of the input disk 28 are received in, i.e., are engaged with the mating female portions 50, 52 of the clutch disk 38, the rotational force is transmitted from the input disk 28 to the clutch disk 38. Also, even in the disengaged state where the mating male portions 34, 36 of the input disk 28 are disengaged from the mating female portions 50, 52 of the clutch disk 38, i.e., in the state where the clutch disk 38 is axially displaced toward the clutch base 20 from the engaged position (a first axial position) to the disengaged position (a second axial position), a predetermined frictional force is generated between the mating male portions 34, 36 of the input disk 28 and the base wall 42 of the clutch disk 38 due to the urging force (the restoring force) of the wave washers 56 to rotate the clutch disk 38 together with the input disk 28. During this rotation, the clutch disk 38 is coupled with the input disk 28 at a reduced rotational coupling force, which is smaller than the maximum coupling force that is achieved through the engagement between the mating male portions 34, 36, of the input disk 28 and the mating female portions 50, 52 of the clutch disk 38. The frictional force of the wave washers 56 is set to achieve this rotation of the clutch disk 38 together with the input disk 28 at the reduced rotational coupling force even in the above disengaged state of the mating male portions 34, 36 and the mating female portions 50, 52.

The yoke housing 98 of the motor main body 92 is formed as a flat type cup shaped cylindrical housing, which has one axial end formed by a drawing process and which has a predetermined cross section that extends in a direction perpendicular to the axis of the rotatable shaft 110. A transverse direction of the predetermined cross section of the flat type cup shaped cylindrical housing coincides with the axial direction of the output shaft 12. The opening of the yoke housing 98 is integrally connected to the housing 96. A bearing 102 is arranged in a base wall 100 of the yoke housing 98. A dielectric resin end housing 104 is secured to the other end of the yoke housing 98.

A bearing 106 is arranged in the center of the end housing 104. The rotatable shaft 110 of the armature 108 is supported by the bearing 106 of the end housing 104 and the bearing 102 of the yoke housing 98, and the armature 108 is received in the yoke housing 98. Magnets 112 are secured to an inner peripheral wall of the yoke housing 98, which is opposed to the armature 108.

Brushes 114 are held by brush cases, respectively, in the end housing 104. Each brush 114 is formed as a generally square rod and is urged against a commutator 116 of the armature 108. A connecting pigtail 118 extends from each brush 114, and a distal end of the pigtail 118 is connected to a corresponding power supply connective line.

The rotatable shaft 110 of the motor main body 92 (the armature 108) is connected to a worm gear 122 of the motion converting mechanism 94 through a coupling 120.

One end of the worm gear 122 is rotatably supported by the housing 96 through a bearing 124. The other end of the worm gear 122 is rotatably supported by the housing 96 through a bearing 126. The worm gear 122 is meshed with a worm wheel 128.

The worm wheel 128 is meshed with the worm gear 122 and is received in the housing 96. The worm wheel 128 rotates about a rotatable shaft 130, which extends in a direction perpendicular to the axis of the worm gear 122 (the rotatable shaft 110).

Figure 11:
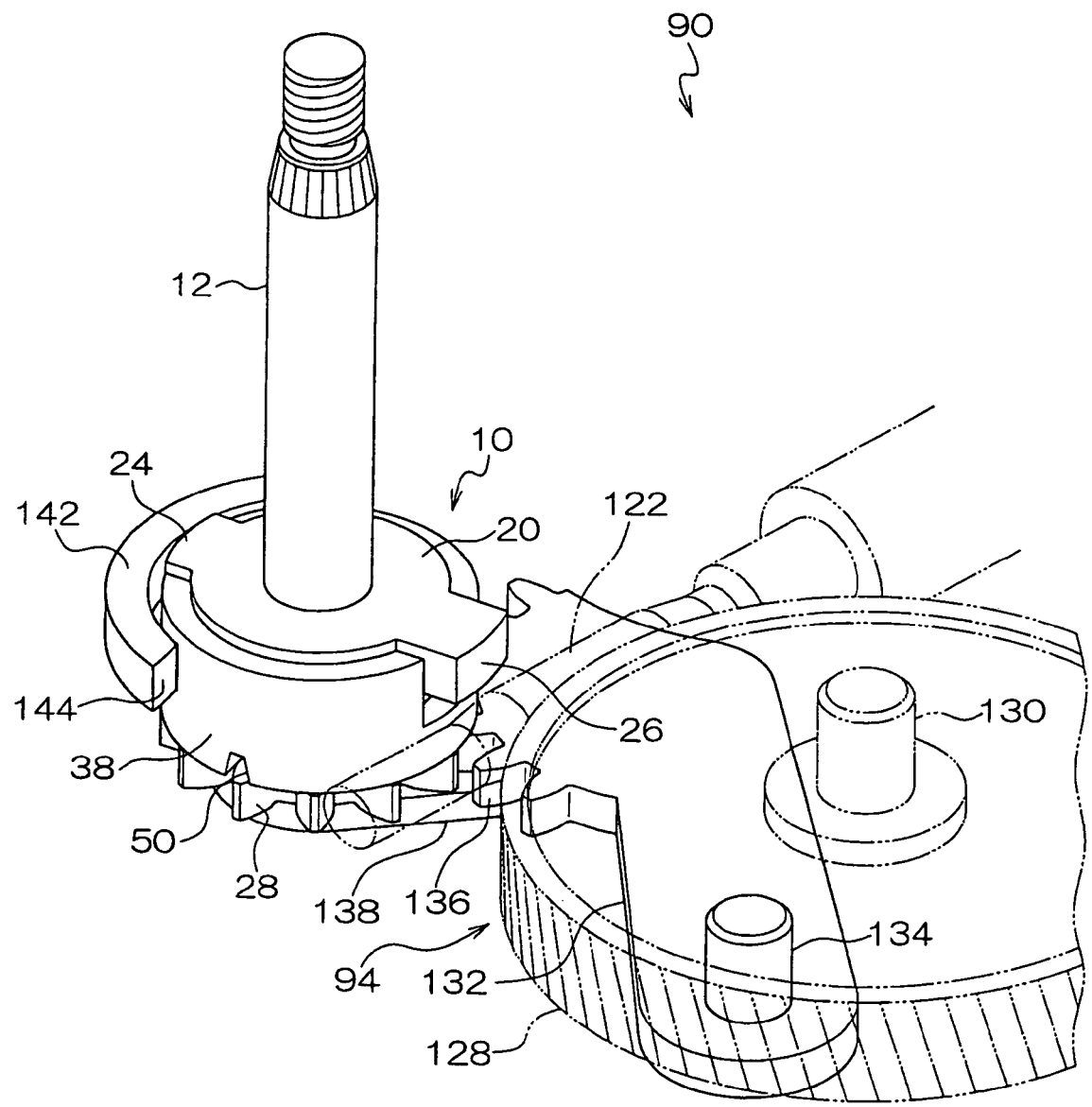
FIG. 11 is a perspective view showing a structure of a main part of the wiper motor apparatus and of the clutch device of the first embodiment of the present invention.
Figure 12:
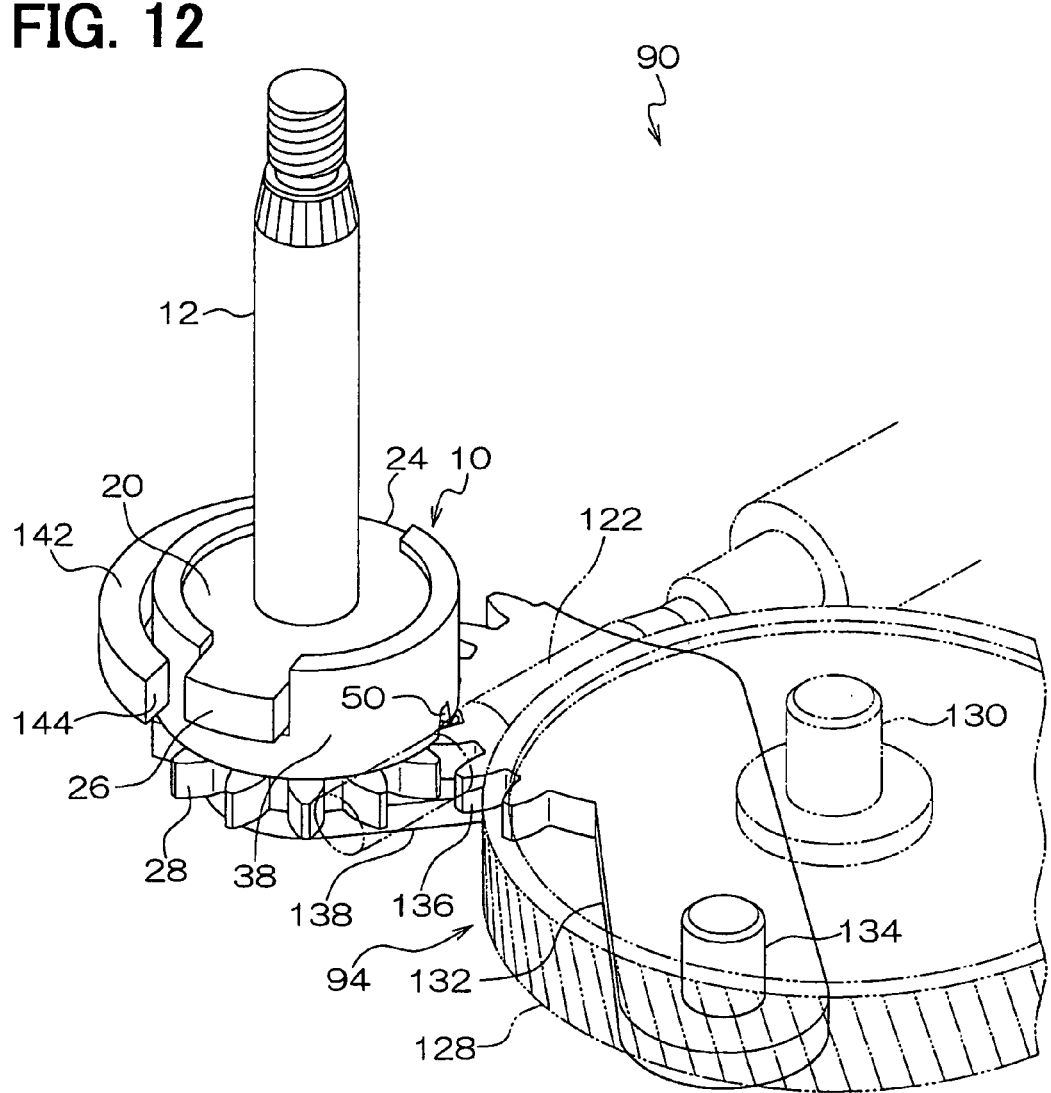
FIG. 12 is a perspective view showing the structure of the main part of the wiper motor apparatus and of the clutch device of the first embodiment and corresponding to FIG. 11 in the declutched state.

A sector gear 132, which serves as a swing member, is connected to the worm wheel 128. As shown in FIGS. 11 and 12, one end of the sector gear 132 is rotatably supported by a support shaft 134. The support shaft 134 is provided to a corresponding point of the worm wheel 128, which is different from that of the rotatable shaft 130, i.e., which is radially displaced from the rotatable shaft 130. A toothed portion 136 is formed in the other end of the sector gear 132 and is meshed with the input disk 28 of the clutch device 10. One end of a holding lever 138 is connected to the sector gear 132 through a support shaft 140. The other end of the holding lever 138 is rotatably connected to the rotational center of the input disk 28, i.e., to the output shaft 12. In this way, a shaft-to-shaft pitch between the support shaft 140 and the output shaft 12 is maintained, and the meshed state between the sector gear 132 and the input disk 28 is maintained. Therefore, when the worm wheel 128 is rotated, the sector gear 132 is swung to reciprocate the input disk 28.

A rear surface side of the housing 96, in which the clutch device 10 and the motion converting mechanism 94 are received, is closed by a cover plate 148.

A sliding member 147, which is made of, for example, a resin material, is connected to a side of the holding lever 138, which is opposite from the sector gear 132. The sliding member 147 is slidably engaged with the cover plate 148. With this structure, the movement of the holding lever 138 in a thickness direction of the holding lever 138 (the axial direction of the output shaft 12) is limited.

A wiper W (FIGS. 14-18) is directly connected to a portion of the output shaft 12, which protrudes outwardly from the housing 96. The wiper W is reciprocally driven upon the reciprocal rotation of the output shaft 12. Furthermore, in this case, a securing strength between the output shaft 12 (the rotation restraining portion 14) and the clutch base 20 (the support hole 22) in the rotational direction is set to be larger than a connecting strength of the wiper W to the output shaft 12 in the rotational direction.

The wiper W is not need to be directly connected to the output shaft 12 and can be indirectly connected to the output shaft 12 through, for example, a link or a rod.

Next, operation of the first embodiment will be described.

In the above wiper motor apparatus 90, when the motor main body 92 (the armature 108) is rotated, the rotational force is transmitted to the worm wheel 128 through the worm gear 122 to rotate the worm wheel 128. When the worm wheel 128 is rotated, the sector gear 132, which is connected to the worm wheel 128, is swung. The swing motion of the sector gear 132 causes reciprocal rotation of the input disk 28.

Figure 5:
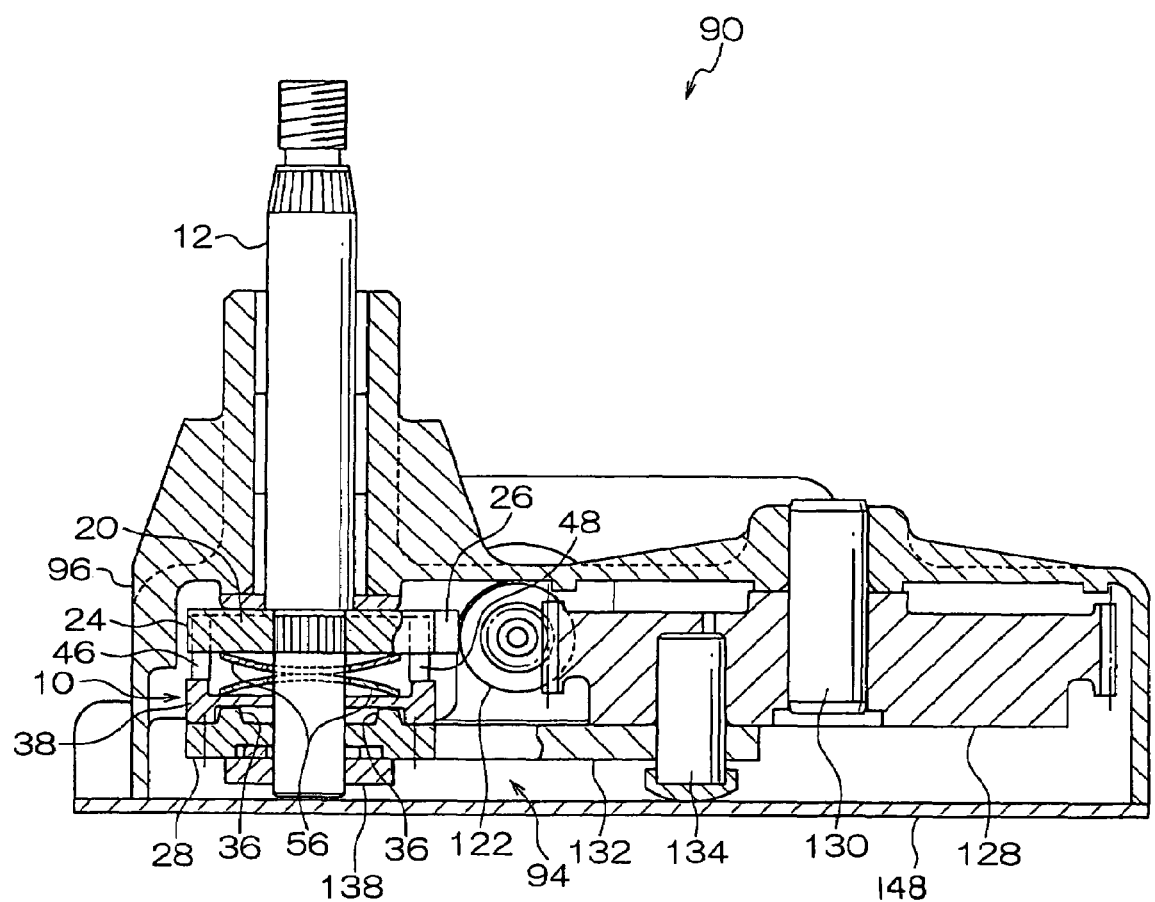
FIG. 5 is a cross sectional view along line V-V in FIG. 4, showing the structure of the wiper motor apparatus of the first embodiment of the present invention.
Figure 6:
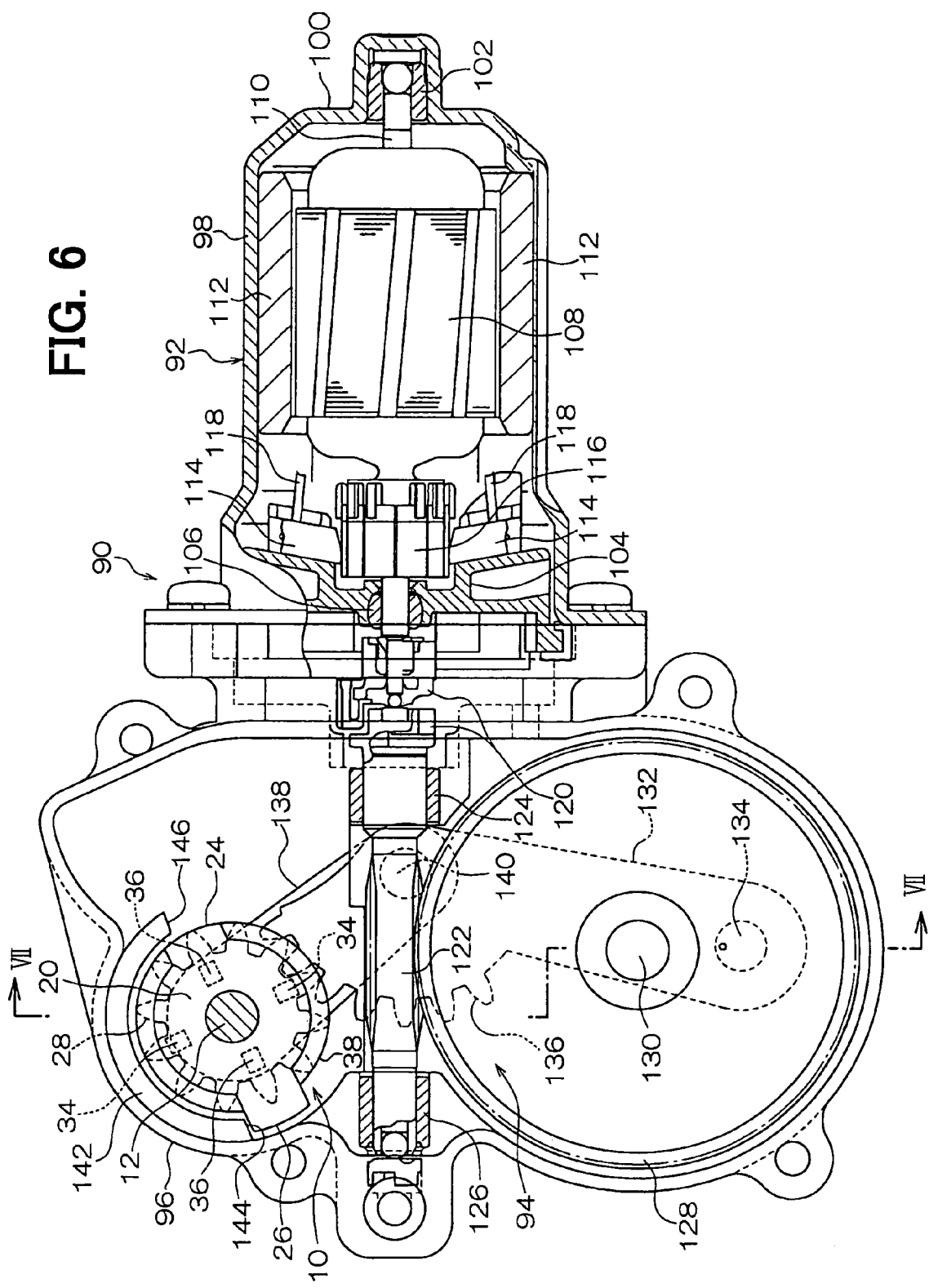
FIG. 6 is a plan cross sectional view showing the structure of the wiper motor apparatus of the first embodiment of the present invention.
Figure 7:
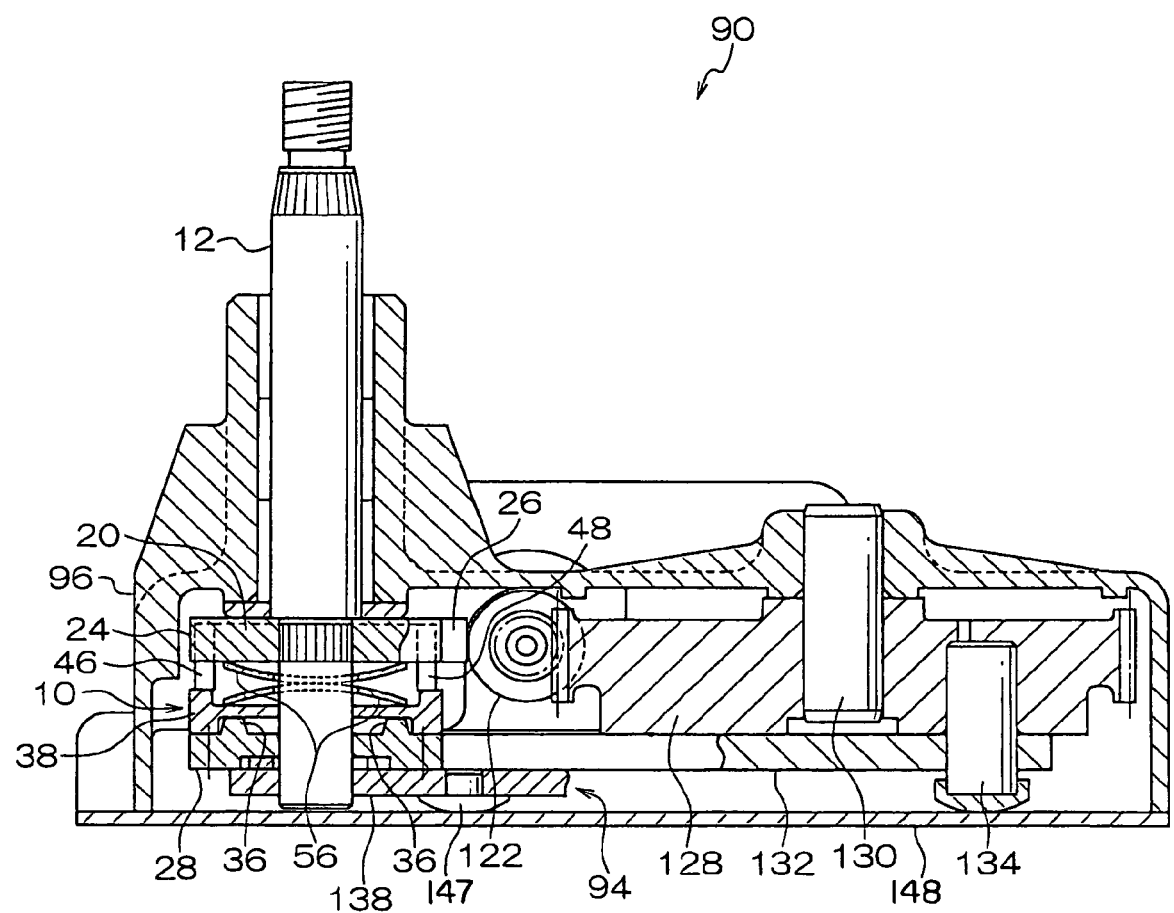
FIG. 7 is a cross sectional view along line VII-VII in FIG. 6, showing the structure of the wiper motor apparatus of the first embodiment of the present invention.

In the normal operational state, the mating male portions 34, 36 of the input disk 28 of the clutch device 10 are engaged with, i.e., are fitted to the mating female portions 50, 52, respectively, of the clutch disk 38. Thus, the clutch disk 38 is coupled with the input disk 28 at the maximum rotational coupling force to rotate integrally with the input disk 28 without making relative rotation between the input disk 28 and the clutch disk 38. In this state, even when the clutch disk 38 tries to move to release the engagement between the mating male portions 34, 36 and the mating female portions 50, 52, the predetermined resistive force is applied from the wave washers 56 to the clutch disk 38. Thus, the engagement between the mating male portions 34, 36 and the mating female portions 50, 52 is maintained. The fitting male portions 24, 26 of the clutch base 20 are fitted into the fitting female guide portions 46, 48, respectively, of the clutch disk 38 in a manner that allows relative axial movement between the fitting male portions 24, 26 of the clutch base 20 and the fitting female guide portions 46, 48 of the clutch disk 38 in the axial direction of the output shaft 12. Thus, as shown in FIGS. 5, 7 and 11, the clutch device 10 is placed in a coupled state. In the coupled state, when the input disk 28 is reciprocally rotated, the rotational drive force is transmitted from the input disk 28 to the clutch disk 38 through the mating male portions 34, 36 and the mating female portions 50, 52. Since the clutch disk 38 is engaged with the clutch base 20, which is secured to the output shaft 12, the rotational drive force, which is transmitted to the clutch disk 38, is transmitted from the clutch disk 38 to the clutch base 20. Therefore, the output shaft 12 is rotated together with the clutch disk 38 and the clutch base 20.

In this way, the wiper W, which is connected to the output shaft 12, is reciprocally swung upon reciprocal rotation of the output shaft 12.

In the wiper motor apparatus 90, in the normal operational state (a rotating state), at the time of transmitting the rotational drive force from the input disk 28 of the clutch device 10 to the output shaft 12, the rotational drive force can be transmitted without causing sliding movement of any relevant component. In other words, the resistive force of the wave washers 56, which is applied to the clutch disk 38 to limit axial movement of the clutch disk 38 from the engaged state to maintain the engaged state between the mating male portions 34, 36 of the input disk 28 and the mating female portions 50, 52 of the clutch disk 38, is not wasted as the sliding frictional force. Therefore, a reduction in the transmission efficiency of the rotation can be advantageously limited. Also, since the rotational drive force can be transmitted without causing the sliding movement of the relevant components, generation of a noise, which could be generated upon sliding movement of the relevant components, can be limited.

Furthermore, as described above, the resistive force of the wave washers 56, which is applied to the clutch disk 38 to limit axial movement of the clutch disk 38 from the engaged state to maintain the engaged state between the mating male portions 34, 36 of the input disk 28 and the mating female portions 50, 52 of the clutch disk 38, is supported by the clutch base 20, which is secured to the output shaft 12, and is also supported by the input disk 28, which is supported by the output shaft 12 while being limited from axial removal from the output shaft 12. That is, the force for maintaining the engaged state is supported by the two constituent components, i.e., the clutch base 20 and the input disk 28, which are installed to the output shaft 12. That is, the clutch device 10 is formed as a complete sub-assembly of the output shaft 12, which does not require any additional component, such as a housing, to serve as the sub-assembly. Thus, the clutch device 10 can be handled as the single component, which is formed as the sub-assembly of the output shaft 12.

Figure 8:
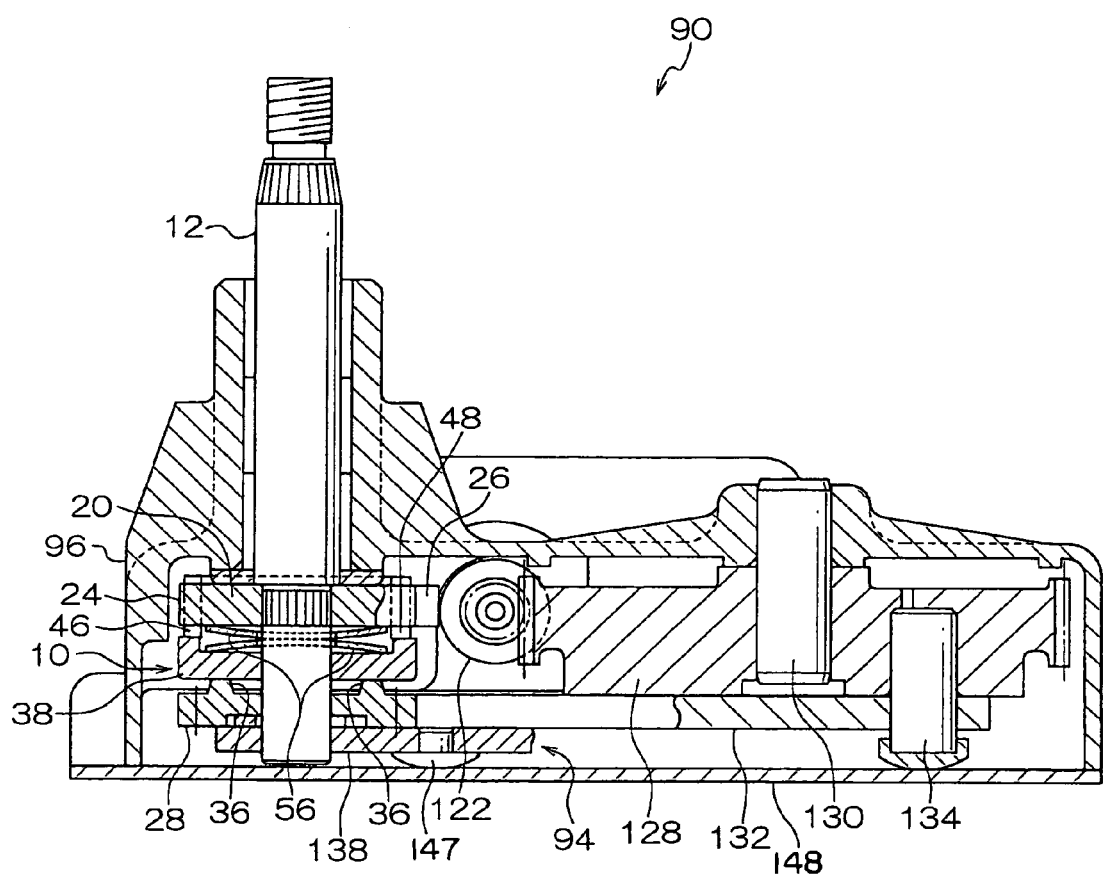
FIG. 8 is a cross sectional view showing the structure of the wiper motor apparatus of the first embodiment of the present invention and corresponding to FIG. 7 in a declutched state.
Figure 9:
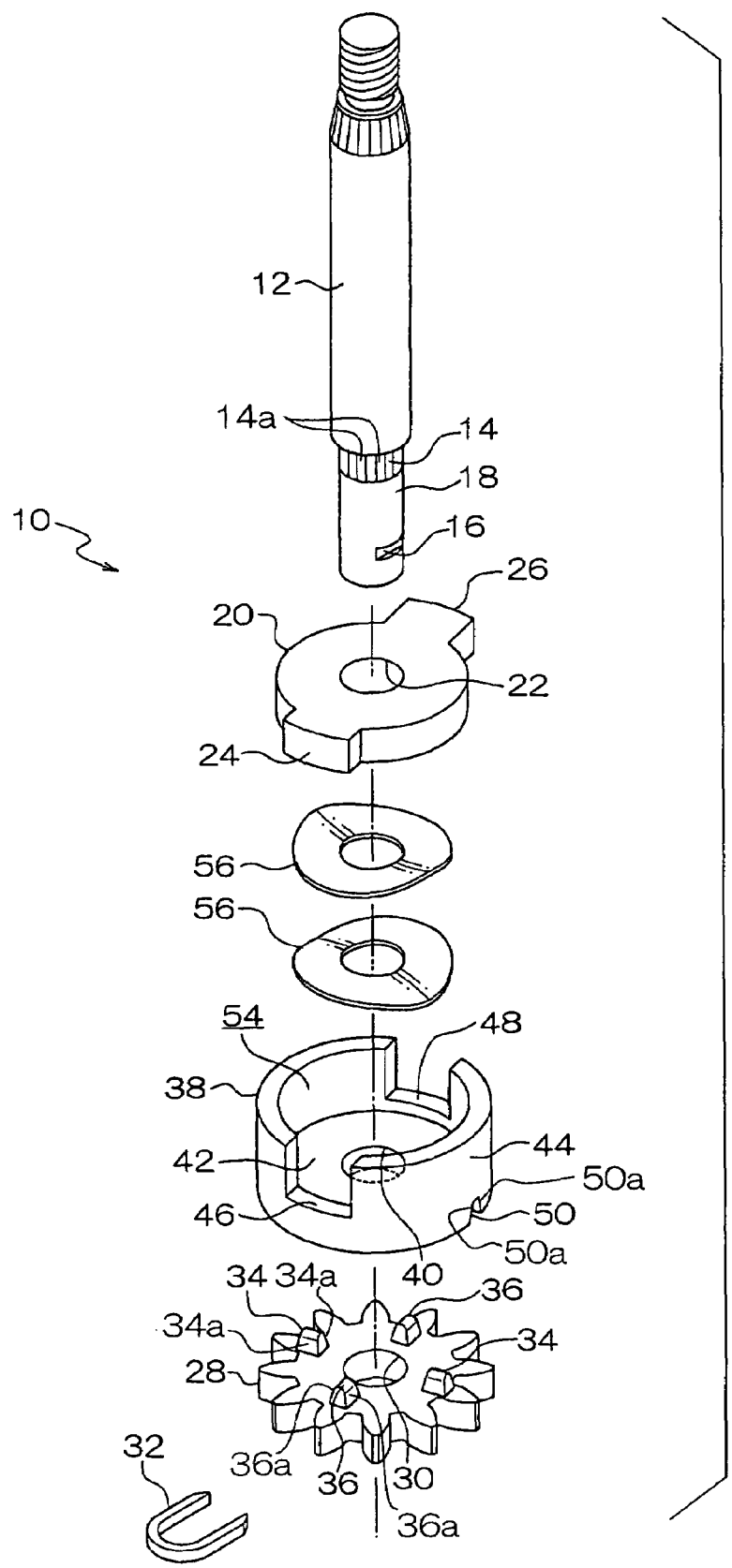
FIG. 9 is an exploded perspective view showing the structure of the clutch device of the first embodiment of the present invention.
Figure 10:
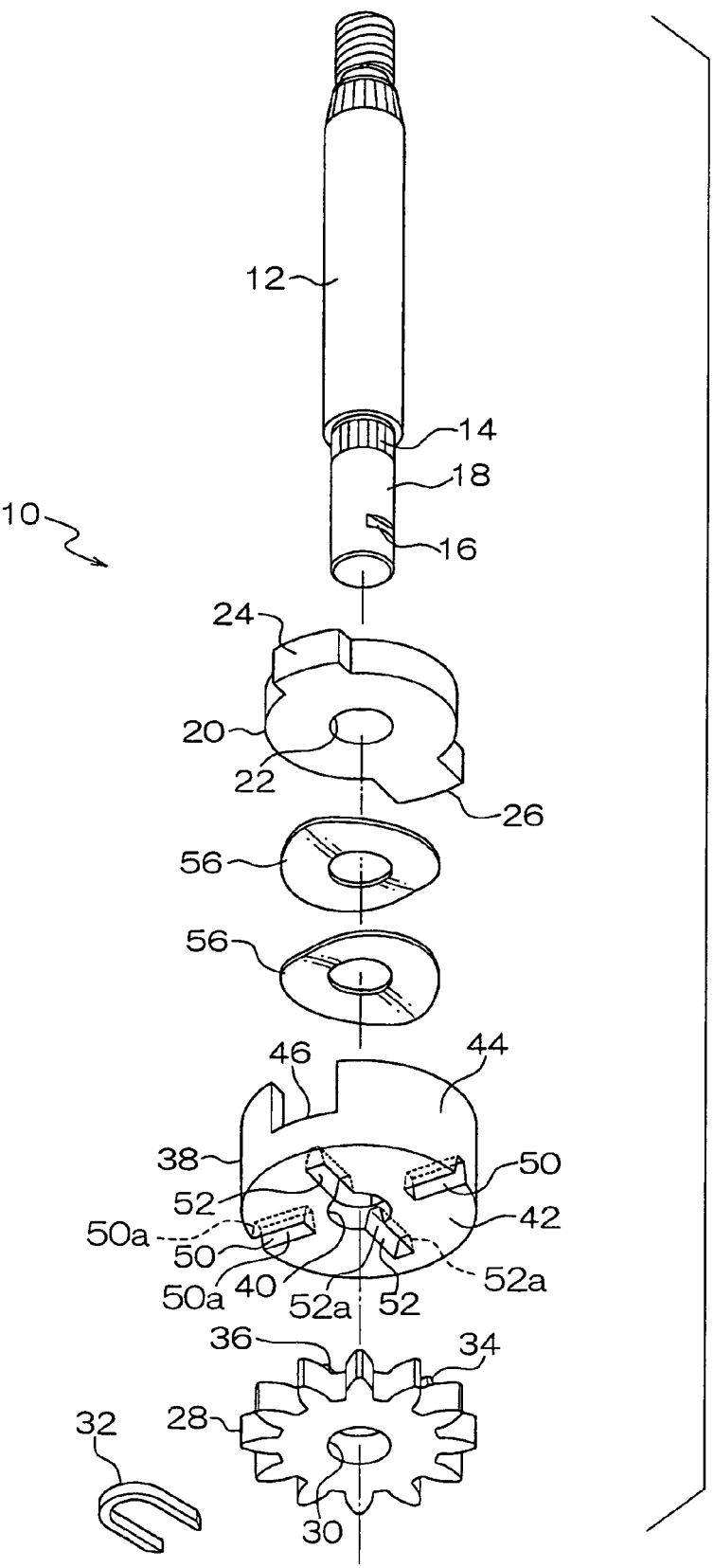
FIG. 10 is an exploded perspective view of the clutch device of the first embodiment of the present invention.

For example, when an excessively large external force (load), which is equal to or greater than a predetermined value, is applied to the output shaft 12 through the wiper W, the output shaft 12 is reversely rotated or is arrested. Then, the clutch disk 38, which is rotated together with the output shaft 12 (the clutch base 20), receives a rotational force through the clutch base 20 in a direction that causes rotation of the clutch disk 38 relative to the input disk 28. Since the lateral walls 34a, 36a of the mating male portions 34, 36 of the input disk 28 and the lateral walls 50a, 52a of the mating female portions 50, 52 of the clutch disk 38 have the slant surfaces (i.e., having the trapezoidal cross section), the force component is generated in the clutch disk 38 in the axial direction of the output shaft 12 toward the clutch base 20 due to the relative rotational force generated by the relative rotation between the input disk 28 and the clutch disk 38. That is, a portion of the relative rotational force generated by the relative rotation between the input disk 28 and the clutch disk 38 serves as the force component, which moves the clutch disk 38 in the axial direction of the output shaft 12 to release the engagement between the mating male portions 34, 36 of the input disk 28 and the mating female portions 50, 52 of the clutch disk 38. When this relative rotational force (the force component) becomes equal to or greater than a predetermined value, the clutch disk 38 overcomes the resistive force and is thus forcefully moved in the axial direction of the output shaft 12 to release the engagement between the mating male portions 34, 36 of the input disk 28 and the mating female portions 50, 52 of the clutch disk 38. That is, as shown in FIGS. 8 and 12, the clutch device 10 is placed in an uncoupled state, i.e., in a declutched state. Thus, the clutch disk 38, i.e., the output shaft 12 is rotated relative to the input disk 28.

In this way, it is possible to limit damage to each component of the clutch device 10, damage to each component (such as the sector gear 132 or the holding lever 138 connected to the input disk 28) of the motion converting mechanism 94 or burnout of the motor main body 92. Furthermore, the strength of each corresponding component can be set without considering the application of such an excessively large external force (load) to that component.

Furthermore, in the wiper motor apparatus 90, the clutch base 20 is secured integrally to the rotation restraining portion 14 of the output shaft 12, which has the ridges. Particularly, the clutch base 20 is securely connected to the rotation restraining portion 14 of the output shaft 12 in the rotational direction about the axis of the output shaft 12. Axial removal of the input disk 28 from the output shaft 12 is limited by the removal limiting portion 16 of the output shaft 12. Furthermore, the clutch disk 38 is axially movably supported around the relatively rotatable shaft portion 18 of the output shaft 12 between the clutch base 20 and the input disk 28. That is, each of the above components is installed to the output shaft 12, and the clutch disk 38 is arranged in the predetermined space (the predetermined dimension) between the clutch base 20 and the input disk 28. Thus, as discussed above, the force (the clutch uncoupling force, i.e., the declutching force) required to axially move the clutch disk 38 can be easily set. Furthermore, in this case, as described above, the lateral walls 34a, 36a of the mating male portions 34, 36 of the input disk 28 and the lateral walls 50a, 52a of the mating female portions 50, 52 of the clutch disk 38 have the slant surfaces, so that the declutching force can be easily set based on the angle of the slant surface and the resistive force (resiliently deforming force) of the wave washers 56.

Furthermore, in the wiper motor apparatus 90, the resilient members are made of the wave washers 56, and the resistive force, which is applied against the axial movement of the clutch disk 38, is implemented by the restoring force of the wave washers 56, which are resiliently deformed by the axial movement of the clutch disk 38. Thus, at the time of applying the excessively large external force (the load) to the output shaft 12, the clutch disk 38 overcomes the restoring force, which is generated by the resilient deformation of the wave washers 56, and is thus axially moved. Thereby, the engagement between the clutch disk 38 (the mating female portions 50, 52) and the input disk 28 (the mating male portions 34, 36) is released, and thus relative rotation between the clutch disk 38 and the input disk 28 occurs.

As described above, when the resilient members are made of the wave washers 56, the force (the declutching force), which is required to axially move the clutch disk 38, is stabilized, resulting in an improvement in the clutch performance. Furthermore, when the resilient members are made of the wave washers 56, the accommodating space for accommodating the resilient members can be reduced or thinned to allow a reduction in the device size. Furthermore, unlike a case where a resiliently compressive deformation of a rubber material 58 described below is used, the wave washers 56 are not damaged or deteriorated by oil, such as grease.

Furthermore, in the wiper motor apparatus 90, the wave washers 56 are received in the receiving portion 54 of the clutch disk 39 of the clutch device 10, and the receiving portion 54 is closed by the clutch base 20. Thus, the wave washers 56 are arranged around the output shaft 12 without positional deviation relative to the clutch base 20 and the clutch disk 38. Therefore, the wave washers 56 can apply the stable urging force (the resiliently deforming force) to both the clutch base 20 and the clutch disk 38.

Furthermore, in the wiper motor apparatus 90 of the first embodiment, as described above, even upon declutching of the clutch device 10, the clutch device 10 can be coupled once again by rotating the motor main body 92 to automatically return the clutch device 10 to its initial position and thereby to connect, i.e., to couple the output shaft 12 (the wiper W) to the motor main body 92 at the predetermined point to perform the normal operation.

That is, in the clutch device 10 of the wiper motor apparatus 90, as described above, each of the mating male portions 34, 36 of the input disk 28 and the corresponding one of the mating female portions 50, 52 of the clutch disk 38, which are engaged with one another in the normal operational state, are displaced from one another, i.e., are disengaged from one another in the rotational direction in the declutched state of the clutch device 10. Each of the mating male portions 34, 36 and the corresponding one of the mating female portions 50, 52 are engaged to one another only at the predetermined single point in the normal reciprocal rotational angular range X of the output shaft 12 (the wiper W). Thus, as described above, at the time of performing the normal operation upon declutching of the clutch device 10, when the motor main body 92 is rotated once again to apply the drive force to the input disk 28 and thereby to rotate the input disk 28 about the output shaft 12, each of the mating male portions 34, 36 and the corresponding one of the mating female portions 50, 52, which have been displaced from one another in the rotational direction, are engaged with one another once again at the predetermined single position in the normal reciprocal rotational angular range X of the output shaft 12. That is, each of the mating male portions 34, 36 and the corresponding one of the mating female portions 50, 52 is automatically returned to its initial position to couple the clutch device 10.

This point will be described with reference to FIGS. 14 to 18. Among the mating male portions 34, 36 and the mating female portions 50, 52, only the single mating male portion 34 and the corresponding mating female portion 50 are depicted in each of FIGS. 14 to 18 for the sake of simplicity. The following description is also made in this manner.

Figure 14:
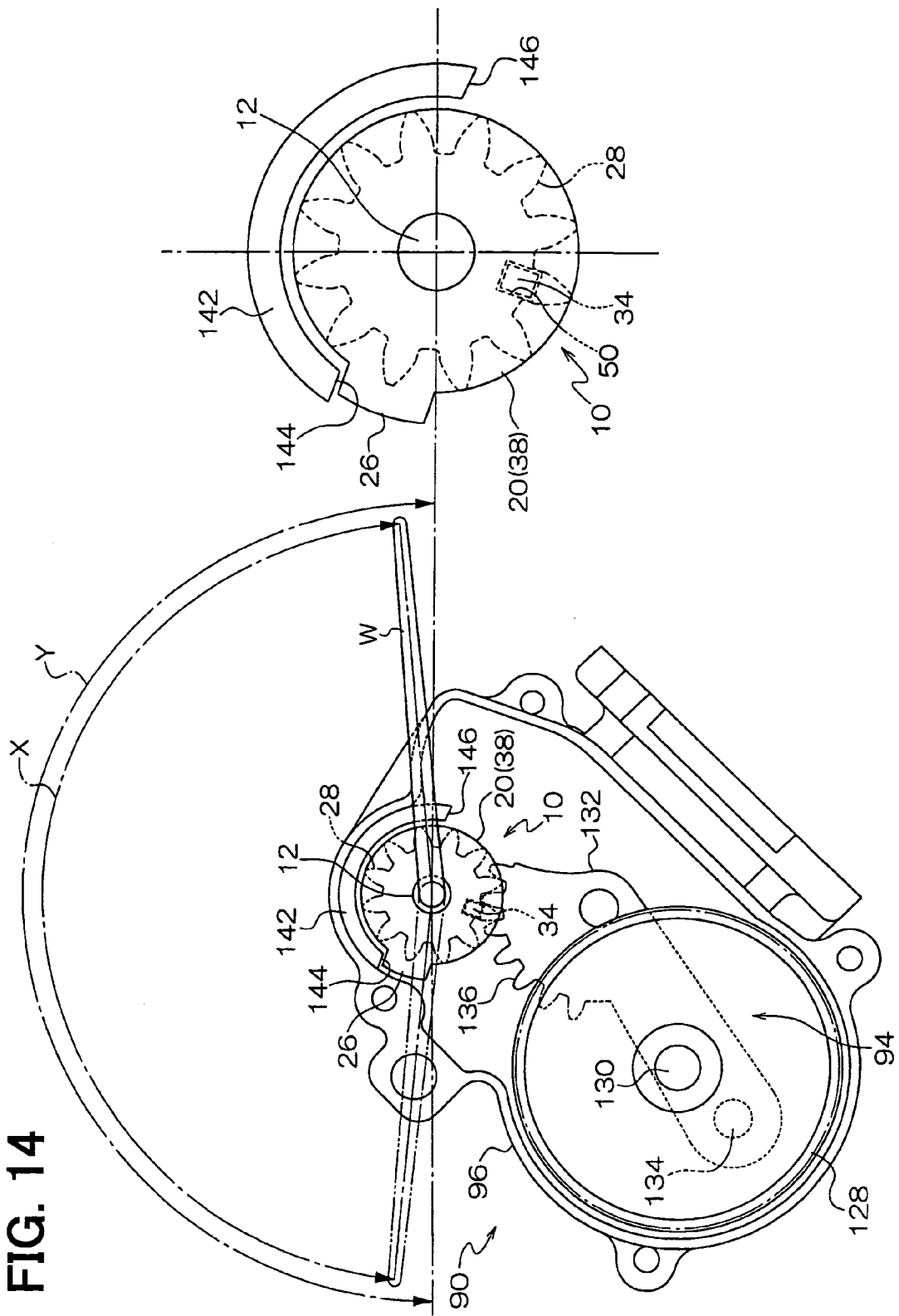
FIG. 14 is a schematic plan view for describing an operation for automatically resetting the clutch device of the wiper motor apparatus of the first embodiment of the present invention to its initial position.

As shown in FIG. 14, in the case where the wiper motor apparatus 90 is stopped at its normal stop position, the wiper W (the output shaft 12) is stopped at a predetermined turning position. Furthermore, the mating male portion 34 and the mating female portion 50 are engaged to one another, and the fitting male portion 26 of the clutch base 20 is placed adjacent to the rotation limiter 144 of the stopper projection 142 (in a disengaged state).

Figure 15:
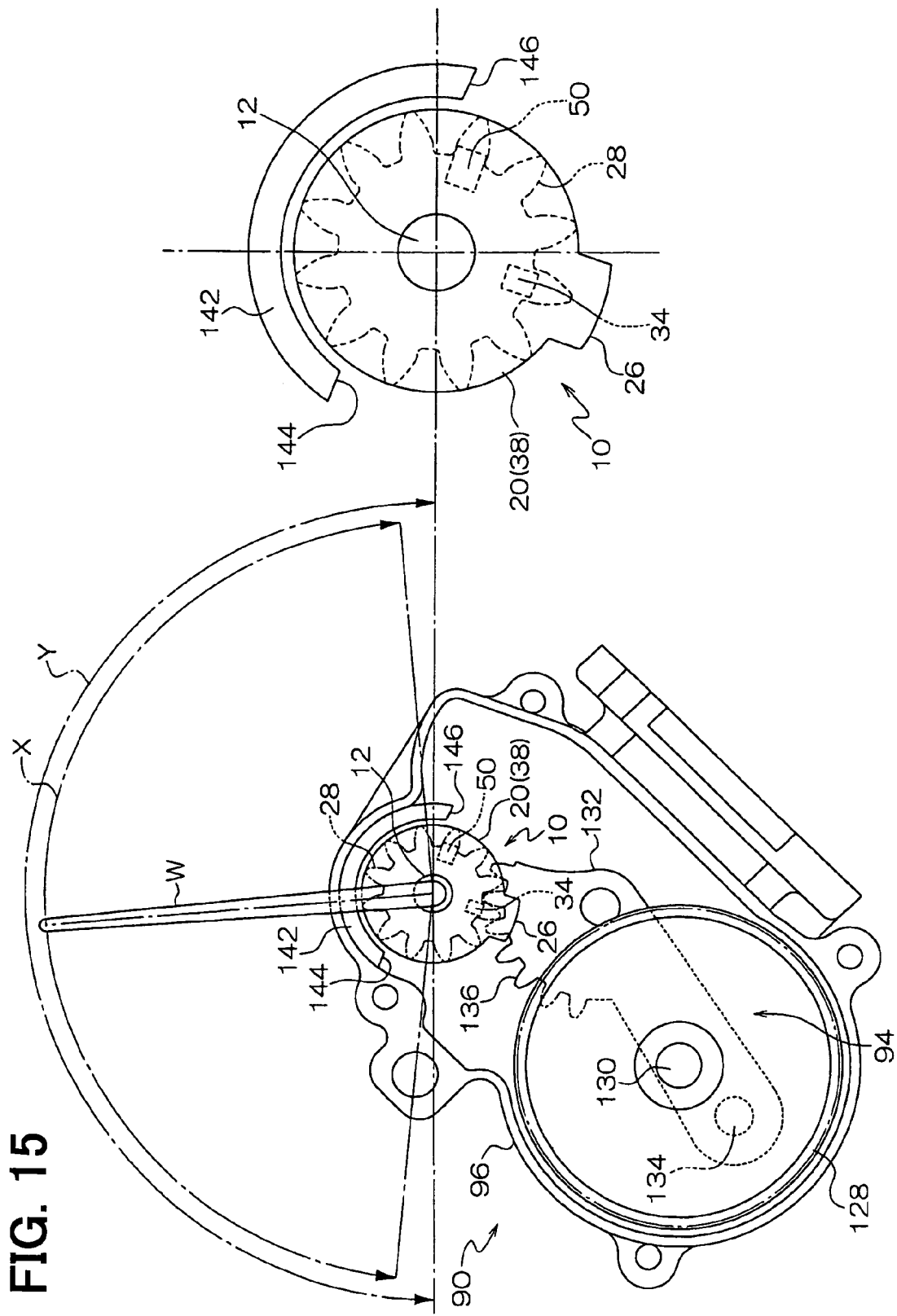
FIG. 15 is a schematic plan view for describing the operation for automatically resetting the clutch device of the wiper motor apparatus of the first embodiment of the present invention to its initial position.

For example, when the wiper W is forcefully pulled toward the center in the stopped state of the wiper motor apparatus 90, the clutch device 10 is declutched, as shown in FIG. 15. Thus, while the input disk 28 is kept stationary, the clutch base 20 and the clutch disk 38 are forcefully rotated together with the output shaft 12. That is, the fitting male portion 26 of the clutch base 20 is moved away from the rotation limiter 144 of the stopper projection 142, and the mating female portion 50 is moved away and is separated from the mating male portion 34.

Figure 16:
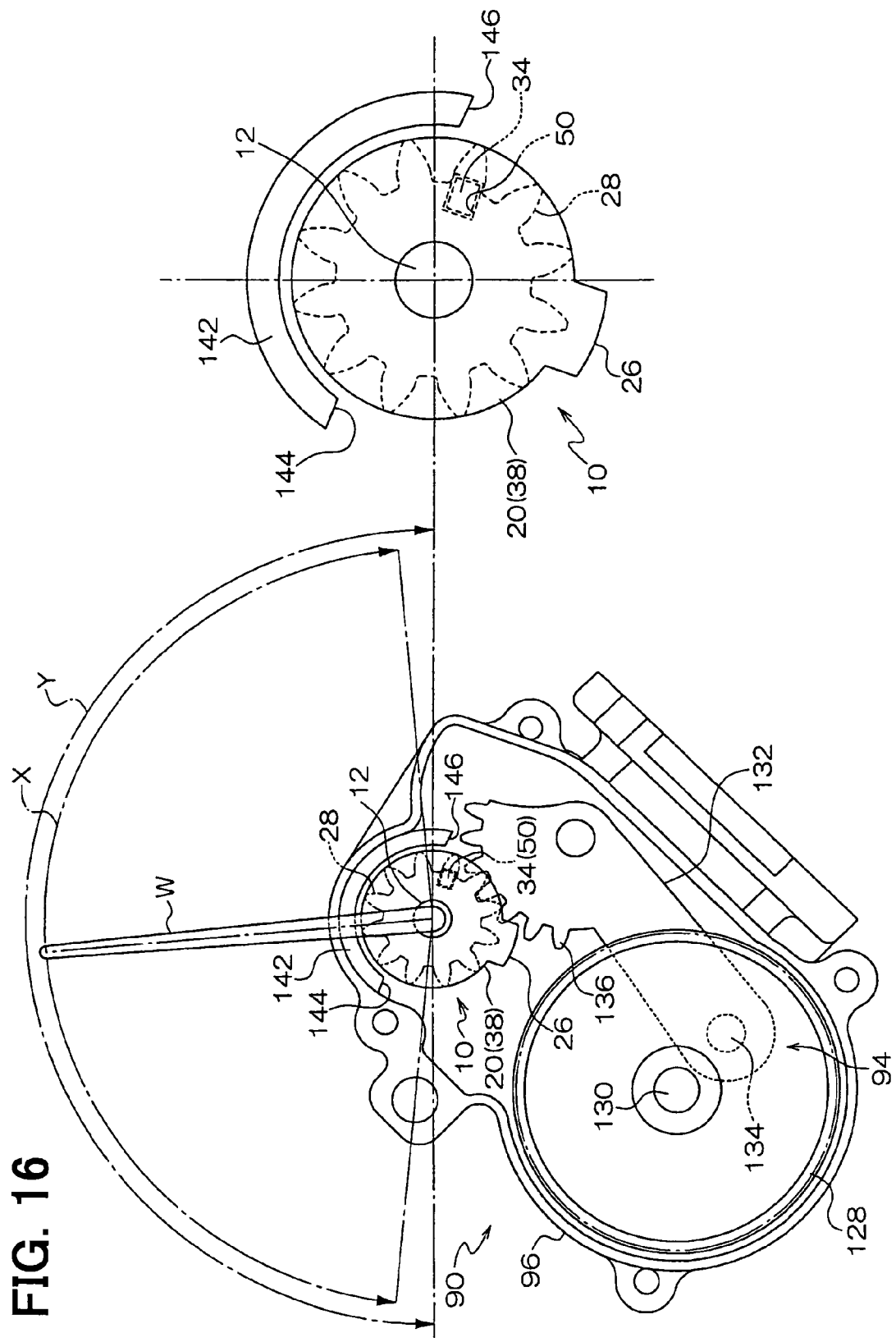
FIG. 16 is a schematic plan view for describing the operation for automatically resetting the clutch device of the wiper motor apparatus of the first embodiment of the present invention to its initial position.

Here, the clutch device 10 is in the declutched state where the mating male portion 34 and the mating female portion 50 are disengaged from one another, i.e., in the state of FIG. 15 where the position of the mating male portion 34 and the position of the mating female portion 50 are displaced from one another in the rotational direction. In this state, at the time of rotating the motor main body 92 once again to supply the drive force to the input disk 28 to rotate the input disk 28 about the output shaft 12 to perform the normal operation, when a drag torque of the input disk 28 and the clutch disk 38 (i.e., a maximum torque for rotating both the input disk 28 and the clutch disk 38) is smaller than the load (weight), which is applied to the output shaft 12 (the wiper W), the input disk 28 rotates by itself and does not rotate together with the clutch disk 38 due to the load (the weight) applied to the output shaft 12 (the wiper W), as shown in FIG. 16. Thereafter, during the rotation of the motor main body 92, the mating male portion 34 and the mating female portion 50 are engaged with one another at the predetermined single point in the normal reciprocal rotational angular range X of the output shaft 12. As a result, the normal operation is resumed.

Figure 17:
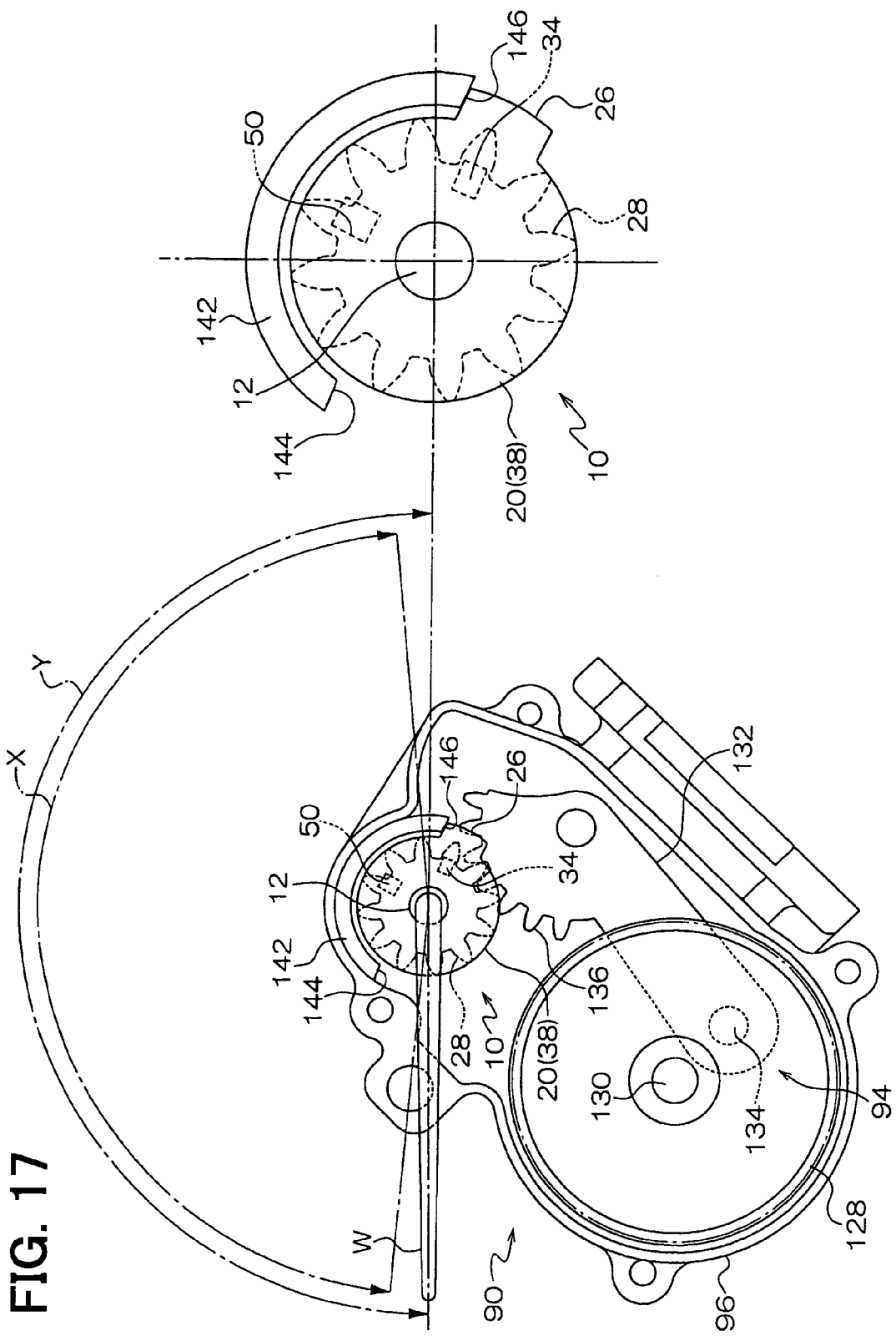
FIG. 17 is a schematic plan view for describing the operation for automatically resetting the clutch device of the wiper motor apparatus of the first embodiment of the present invention to its initial position.

In contrast, in the declutched state of the clutch device 10 where the mating male portion 34 and the mating female portion 50 are disengaged from one another, i.e., where the mating male portion 34 and the mating female portion 50 are displaced from one another in the rotational direction, as shown in FIG. 15, at the time of rotating the motor main body 92 once again to supply the drive force to the input disk 28 to rotate the input disk 28 about the output shaft 12 to perform the normal operation, when the drag torque of the input disk 28 and the clutch disk 38 (i.e., the maximum torque for rotating both the input disk 28 and the clutch disk 38) is larger than the load (weight), which is applied to the output shaft 12 (the wiper W), the input disk 28 rotates together with the clutch disk 38, as shown in FIG. 17. In other words, the clutch disk 38 is coupled with the input disk at the reduced rotational coupling force, which is smaller than the maximum rotational coupling force, to rotate along with the input disk 28 at the time of rotating the input disk 28. During this rotation of the input disk 28 together with the clutch disk 38, the fitting male portion 26 of the clutch base 20 is engaged with the other rotation limiter 146 of the stopper projection 142, so that the rotation of the clutch disk 38 is limited. At this time, the rotation of the wiper W is limited within the predetermined limited angular range Y. Therefore, the wiper W does not move into the vehicle body region beyond the window glass area of the vehicle, so that the wiper W will not damage the vehicle body.

Figure 18:
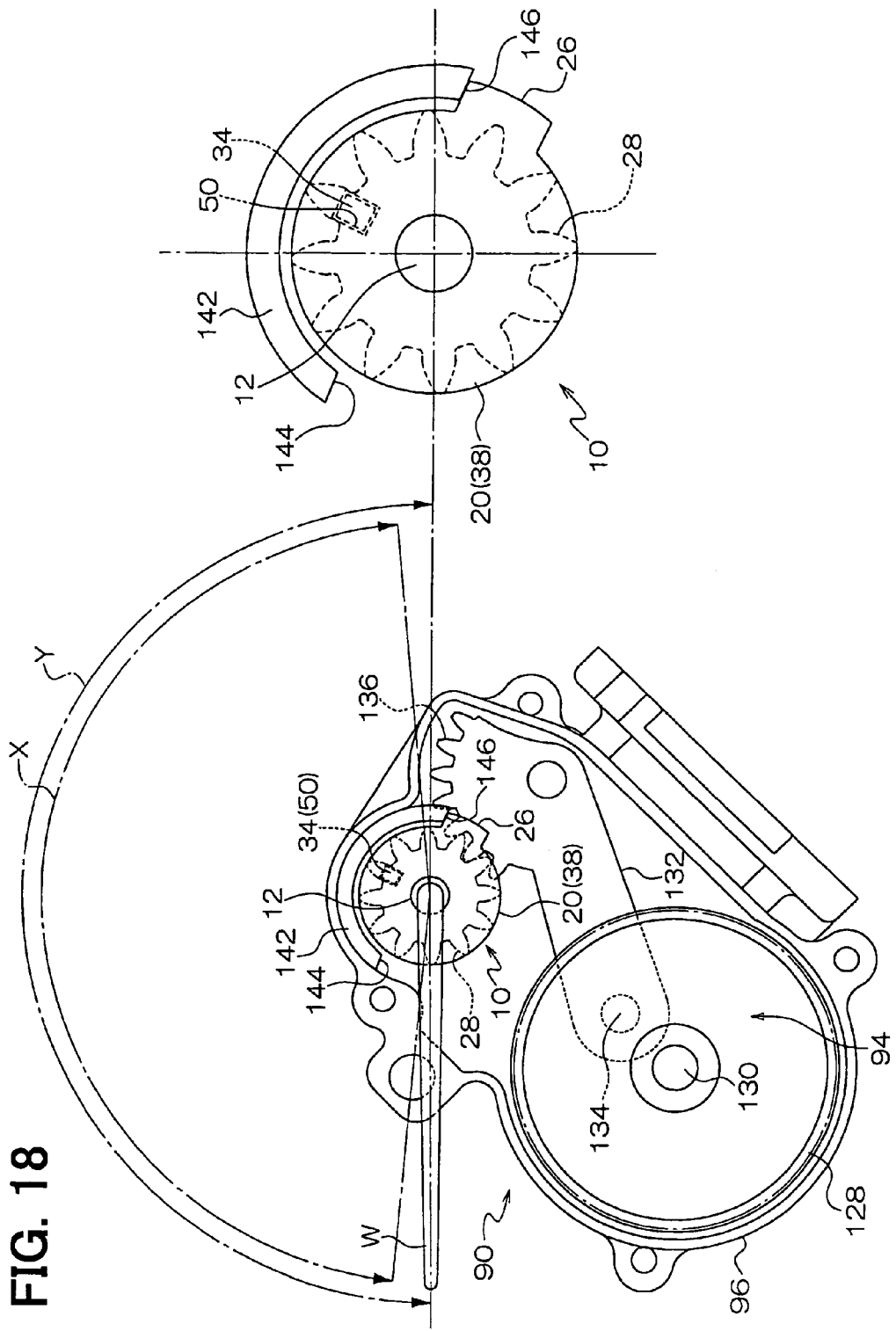
FIG. 18 is a schematic plan view for describing the operation for automatically resetting the clutch device of the wiper motor apparatus of the first embodiment of the present invention to its initial position.

Then, the input disk 28 is further rotated relative to the clutch disk 38, which is prevented from rotating further. Thereafter, as shown in FIG. 18, the mating male portion 34 and the mating female portion 50 are engaged with one another once again at the predetermined single point in the normal reciprocal rotational angular range X of the output shaft 12. Thus, the normal operation is resumed.

As described above, in the wiper motor apparatus 90 (the clutch device 10) of the present embodiment, in the declutched state of the clutch device 10, i.e., in the state where relative rotation between the output shaft 12 (the wiper W) and the motor main body 92 occurs, when the motor main body 92 is rotated further, the clutch device 10 is automatically returned to its initial position, so that the motor main body 92 side is connected to the output shaft 12, i.e., the clutch device 10 is coupled at the predetermined point to resume the normal operation.

Furthermore, in the wiper motor apparatus 90, the two pairs of mating male portions 34, 36 and the two pairs of mating female portions 50, 52 are provided. Thus, the drive torque, which is transmitted from the input disk 28 (the mating male portions 34, 36) to the clutch disk 38 (the mating female portions 50, 52), can be increased to drive the output shaft 12 with the larger torque. Thus, the motor apparatus 90 can be effectively used as the drive source of the vehicle wiper system or of a sunroof system.

Furthermore, in the wiper motor apparatus 90 (the clutch device 10), the rotation limiters 144, 146, which limit the reciprocal rotation of the clutch disk 38 (of the clutch base 20 and of the output shaft 12), are made integrally in the stopper projection 142, which is provided in the housing 96 that rotatably supports the output shaft 12. Thus, the stopper projection 142 can be formed integrally with the housing 96. As a result, accuracy of the limited angle (the limited angular range Y of the rotation limiters 144, 146) of the stopper projection 142 is improved, and the structure is simplified.

Also, the fitting male portion 26, which is engaged with the stopper projection 142, is formed to project radially outward of the clutch disk 38 and of the clutch base 20. That is, the component, which limits the reciprocal rotation of the clutch disk 38 (of the clutch base 20 and of the output shaft 12), is positioned at the location that is spaced as much as possible from the output shaft 12 in the radial direction. Thus, the accuracy of the limited angle (the limited angular range Y of the rotation limiters 144, 146), which is defined by the stopper projection 142 and the fitting male portion 26, is further improved.

Also, in the wiper motor apparatus 90 (the clutch device 10) of the first embodiment, the securing strength between the output shaft 12 (the rotation restraining portion 14) and the clutch base 20 (the support hole 22) in the rotational direction is set to be larger than the connecting strength of the wiper W to the output shaft 12 in the rotational direction. Thus, for example, in the state where the rotation of the output shaft 12 (the wiper W) is limited by one of the rotation limiters 144, 146 in the declutched state of the clutch device 10, when the excessively large load is further applied to the wiper W for rotating the output shaft 12 beyond the limited angular range Y, the wiper W is rotated relative to the output shaft 12 (the rotation restraining portion 14). In this way, the excessively large load is not transmitted to the internal components of the motor apparatus 90. Thus, the drive force transmitting components, which are located after the output shaft 12, can be protected. These components include, for example, the components of the clutch device 10, the components (e.g., the sector gear 132 and the holding lever 138 connected to the input disk 28) of the motion converting mechanism 94 and the components, such as the worm wheel 128, the worm gear 122 and the motor main body 92, which are located between the output shaft 12 and the armature 108.

As described above, in the wiper motor apparatus 90 (the clutch device 10) of the present embodiment, in the state where the clutch device 10 is declutched, i.e., in the state where relative rotation between the output shaft 12 (the wiper W) and the motor main body 92 occurs, when the motor main body 92 is rotated further, the clutch device 10 is automatically returned to its initial position, so that the motor main body 92 is connected to the output shaft 12, i.e., the clutch device 10 is coupled at the predetermined point to resume the normal operation. Furthermore, the damage to the components or the damage to the driving side component (e.g., damage to the motor main body 92) can be limited at the time of locking the output shaft 12 (the wiper W).

Therefore, the wiper motor apparatus 90 is also suitable as a wiper motor apparatus of a vehicle, such as a truck or a constructor having a cab-over type cockpit, which will likely have an excessively large force (load) on the output shaft 12 through the wiper W at the time of, for example, application of heavy snow, which is accumulated on a roof of the vehicle, to the wiper arm upon vertical falling of the heavy snow along the glass surface.

In the first embodiment, the wave washers 56 are used as the resilient members of the clutch device 10. However, the resilient members of the clutch device 10 are not limited to the wave washers 56.

Figure 19:
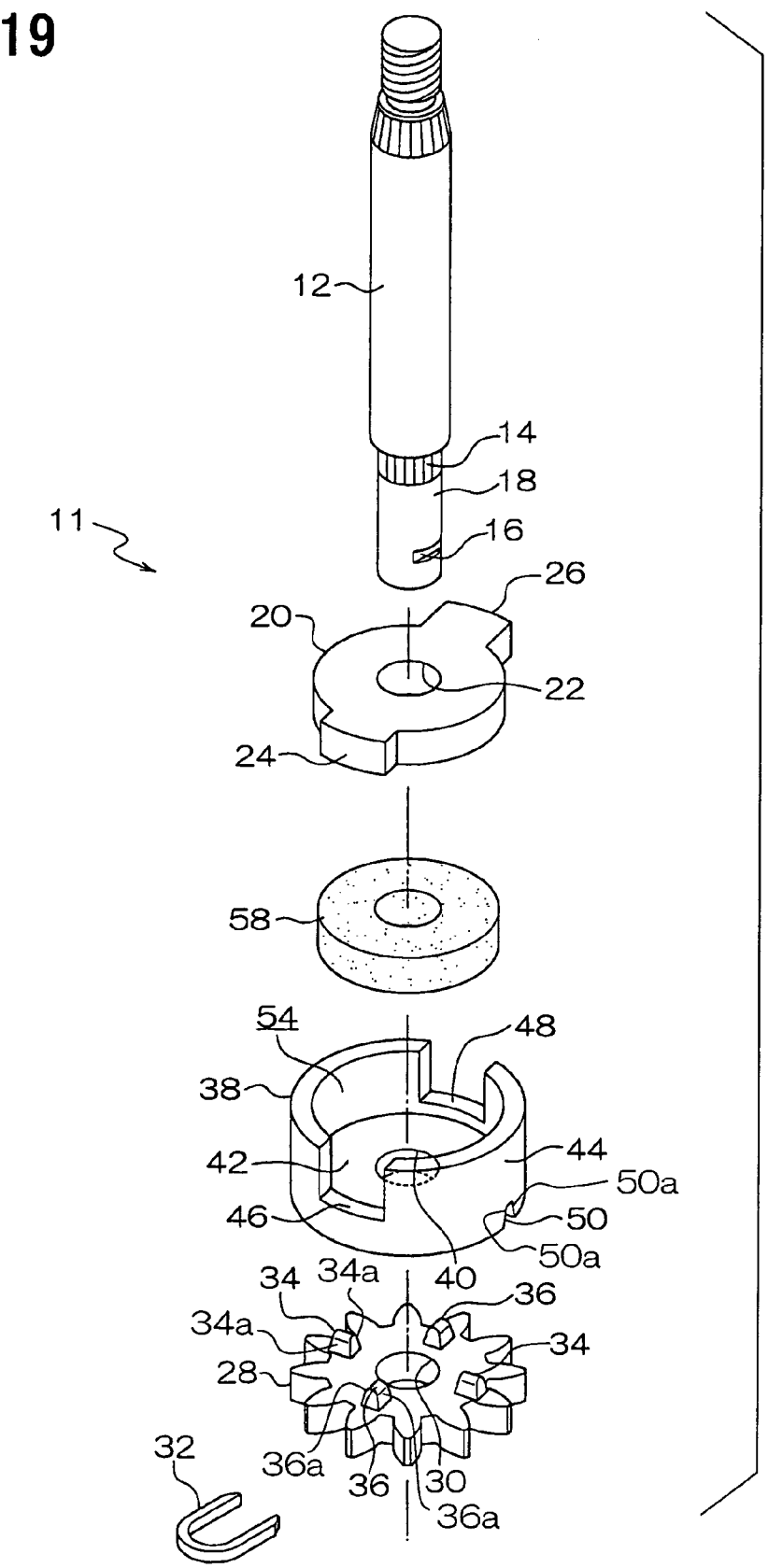
FIG. 19 is an exploded perspective view showing a structure of a modification of the clutch device of the first embodiment of the present invention.

For example, as in a case of a clutch device 11 shown in FIG. 19, a circular disk shaped rubber member 58 may be used as the resilient member. The resistive force, which is applied to the clutch disk 38 to limit the axial movement of the clutch disk 38, can be implemented by the restoring force of the rubber member 58, which is resiliently compressively deformed. In such a case where the rubber member 58 is used as the resilient member, it is possible to stop application of the urging force for maintaining the engagement between the clutch disk 38 (the mating female portions 50, 52) and the input disk 28 (the mating male portions 34, 36) in the normal operation. Thus, effects of long term stress, which is caused by, for example, deformation of the resilient member, can be reduced to limit deterioration of the resilient member.

Furthermore, the resilient member(s) is not limited to the wave washer 56 or the rubber member 58 and can be further alternatively a compression coil spring or a Belleville spring.

Furthermore, in these cases, at the time of the normal state (the state where the clutch disk 38 does not move toward the clutch base 20), each resilient member, such as the rubber member 58, may apply the urging force between the clutch base 20 and the clutch disk 38. Alternatively, each resilient member, such as the rubber member 58, may apply the urging force (the restoring force) against the clutch disk 38 only when the clutch disk 38 is moved toward the clutch base 20, i.e., only when the mating male portions 34, 36 try to move away from the mating female portions 50, 52.

Next, other embodiments will be described. It should be noted that components similar to those of the first embodiment will be indicated by the same numerals throughout the other embodiments and will not be described again for the sake of simplicity.

Second Embodiment

Figure 20:
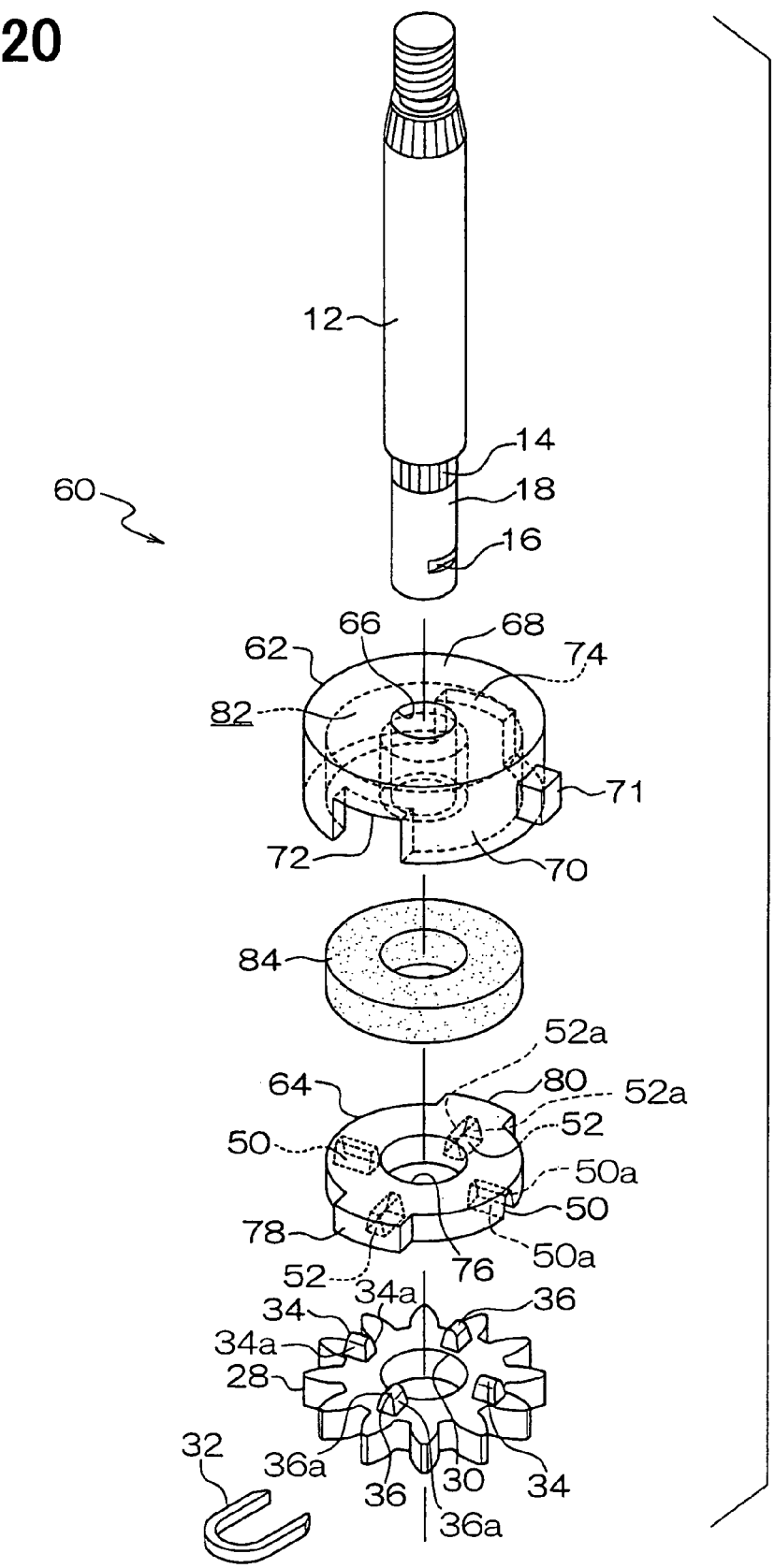
FIG. 20 is an exploded perspective view showing a structure of a clutch device according to a second embodiment of the present invention.

FIG. 20 is a perspective exploded view of a clutch device 60 according to a second embodiment of the present invention.

The clutch device 60 has a structure, which is basically the same as that of the clutch device 10 of the first embodiment. However, the clutch device 60 includes a clutch base 62 in place of the clutch base 20 and also includes a clutch disk (the second rotatable member) 64 in place of the clutch disk 38.

The clutch base 62 is formed into a cup shape and includes a base wall 68 and a peripheral wall 70. A support hole 66, which corresponds to the output shaft 12, is formed through the base wall 68. The peripheral wall 70 extends from a peripheral edge of the base wall 68 in the axial direction of the output shaft 12. The support hole 66 is secured to the rotation restraining portion 14 of the output shaft 12, so that the clutch base 62 rotates integrally with the output shaft 12. Fitting female guide portions 72, 74 are provided in an opening side peripheral part of the peripheral wall 70.

The clutch disk 64 is formed as a circular disk shaped body and has a shaft hole 76 that corresponds to the output shaft 12. The output shaft 12 (the relatively rotatable shaft portion 18) is received through the shaft hole 76 of the clutch disk 64. The clutch disk 64 is located on the other axial end side of the output shaft 12 (the clutch base 62 side) with respect to the input disk 28 and is supported by the output shaft 12 in such a manner that the clutch disk 64 is movable relative to the output shaft 12 in the axial direction of the output shaft 12. Furthermore, a pair of fitting male portions 78, 80 is provided to correspond with the fitting female guide portions 72, 74 of the clutch base 62 in an outer peripheral part of the clutch disk 64. The fitting male portions 78, 80 are opposed to one another in a circumferential direction of the clutch disk 64, i.e., are displaced 180 degrees from one another in the circumferential direction of the clutch disk 64 and protrude in a radial direction of the output shaft 12. The fitting male portions 78, 80 of the clutch disk 64 are axially moved and are fitted into the fitting female guide portions 72, 74 of the clutch base 62. In this way, the clutch disk 64 is rotated together with the clutch base 62 (i.e., the output shaft 12) and is axially movable relative to the clutch base 62 in the axial direction of the output shaft 12.

Furthermore, similar to the first embodiment, two pairs of mating female portions 50, 52 are recessed in a back surface of the clutch disk 64 (an input disk 28 side, i.e., the one axial end side of the output shaft 12).

Furthermore, an interior of the clutch base 62, i.e., an internal space defined by the base wall 68 and the peripheral wall 70 forms a receiving portion 82. The clutch disk 64 is fitted to the opening side peripheral part of the peripheral wall 70 of the clutch base 62 in such a manner that the clutch disk 64 closes the receiving portion 82.

The receiving portion 82 receives a rubber member 84, which serves as the resilient member. The rubber member 84 is arranged between the clutch base 62 (the base wall 68) and the clutch disk 64. The rubber member 84 applies a predetermined resistive force (a restoring force generated at the time of resiliently compressive deformation of the rubber member 84 caused by axial movement of the clutch disk 64) against the axial movement of the clutch disk 64 toward the other output shaft 12 axial end side (toward the clutch base 62 side) from the engaged state, in which the mating male portions 34 of the input disk 28 and the mating female portions 50 of the clutch disk 64 are engaged with one another.

The other components are the same as those of the clutch device 10 of the first embodiment.

In the first embodiment, the clutch device 10 is applied to the wiper motor apparatus 90. However, the present invention is not limited to this. For example, the wiper motor may be formed by using the clutch device 60 of the second embodiment.

In this case, a projection 71, which engages the rotation limiter 144 or 146 of the stopper projection 142, may be formed in the peripheral wall 70 of the clutch base 62. In this way, the rotation of the clutch base 62 (the output shaft 12) can be limited within the predetermined range.

Next, operation of the second embodiment will be described.

The clutch device 60 (and the wiper motor apparatus having the clutch device 60) provides the advantages similar to those of the clutch device 10 and of the wiper motor apparatus 90 of the first embodiment.

More specifically, in the normal operational state, when the drive force is supplied to the input disk 28 to rotate the input disk 28 about the output shaft 12, the rotational drive force is transmitted from the input disk 28 to the clutch disk 64 through the mating male portions 34, 36 and the mating female portions 50, 52. Since the clutch disk 64 is engaged with the clutch base 62, which is secured to the output shaft 12, the rotational drive force transmitted to the clutch disk 64 is transmitted from the clutch disk 64 to the clutch base 62. Thus, the output shaft 12 is rotated together with the clutch disk 64 and the clutch base 62.

Here, even in the case of the clutch device 60, in the normal operational state (the rotating state), as discussed above, at the time of transmitting the rotational drive force from the input disk 28 to the output shaft 12, the rotational drive force can be transmitted without causing sliding movement of any relevant components. More specifically, the resistive force of the rubber member 84, which is applied against the axial movement of the clutch disk 64 from the engaged state of the clutch disk 64 to maintain the engaged state between the mating male portions 34, 36 of the input disk 28 and the mating female portions 50, 52 of the clutch disk 64, is not wasted as the sliding frictional force. Thus, it is possible to limit a reduction in the transmission efficiency of the rotation. Furthermore, the rotational drive force can be transmitted without causing sliding movement of any relevant components. Thus, generation of a noise, which would be generated by the sliding movement of the relevant components, can be advantageously limited.

Furthermore, as discussed above, the resistive force of the rubber member 84, which is applied against the axial movement of the clutch disk 64 from the engaged state to maintain the engagement between the mating male portions 34, 36 and the mating female portions 50, 52, is received by the clutch base 62, which is secured to the output shaft 12, and is also received by the input disk 28, which is supported by the output shaft 12 in a manner that limits axial removal of the input disk 28 from the output shaft 12. That is, the force for maintaining the engaged state is supported by the two constituent components, i.e., the clutch base 62 and the input disk 28, which are installed to the output shaft 12. In other words, the clutch device 60 is formed as a complete sub-assembly of the output shaft 12, which does not require any additional component, such as a housing, to serve as the sub-assembly. Thus, the clutch device 60 can be handled as the single component, which is formed as the sub-assembly of the output shaft 12.

For example, when an excessively large external force (load) is applied to the output shaft 12, the output shaft 12 is reversely rotated or is arrested. Then, the clutch disk 64, which is rotated together with the output shaft 12 (the clutch base 62), receives a rotational force through the clutch base 62 to rotate the clutch disk 64 relative to the input disk 28. Since the lateral walls 34a, 36a of the mating male portions 34, 36 of the input disk 28 and the lateral walls 50a, 52a of the mating female portions 50, 52 of the clutch disk 64 have the slant surfaces (i.e., having the trapezoidal cross section), the force component is generated in the clutch disk 64 in the axial direction of the output shaft 12 toward the clutch base 62 due to the relative rotational force generated by the relative rotation between the input disk 28 and the clutch disk 64. When this relative rotational force (the force component) becomes equal to or greater than a predetermined value, the clutch disk 64 overcomes the resistive force applied from the rubber member 84 and is forcefully moved in the axial direction of the output shaft 12 to release the engagement (i.e., releasing the engagement by moving the mating male portions 34, 36 away from the mating female portions 50, 52 of the clutch disk 64). Thus, relative rotation between the clutch disk 64, i.e., the output shaft 12 and the input disk 28 occurs.

In this way, it is possible to limit damage to each component or burnout of the motor main body 92, which is connected to the input disk 28. Furthermore, it is not required to set the strength of each corresponding component upon consideration of the application of such an excessively large external force (load).

Furthermore, even when the clutch device 60 of the second embodiment is declutched, the clutch device 60 (and the wiper motor apparatus having the clutch device 60) can be automatically returned to its initial position to connect the output shaft 12 (the wiper W) to the motor main body 92 at the predetermined point to resume the normal operation through rotation of the motor main body 92.

That is, in the clutch device 60, as described above, each of the mating male portions 34, 36 of the input disk 28 and the corresponding one of the mating female portions 50, 52 of the clutch disk 64, which are engaged with one another in the normal operational state, are displaced from one another, i.e., are disengaged from one another in the rotational direction in the declutched state of the clutch device 60. Each of the mating male portions 34, 36 and the corresponding one of the mating female portions 50, 52 are engaged to one another only at the predetermined single point in the normal reciprocal rotational angular range X of the output shaft 12 (the wiper W). Thus, as described above, at the time of performing the normal operation upon declutching of the clutch device 60, when the motor main body 92 is rotated once again to apply the drive force to the input disk 28 and thereby to rotate the input disk 28 about the output shaft 12, each of the mating male portions 34, 36 and the corresponding one of the mating female portions 50, 52, which have been displaced from one another in the rotational direction, are engaged with one another once again at the predetermined single point in the normal reciprocal rotational angular range X of the output shaft 12. That is, each of the mating male portions 34, 36 and the mating female portions 50, 52 is automatically returned to its initial position to couple the clutch device 60.

As described above, even when the clutch device 60 of the second embodiment is declutched, i.e., even when the relative rotation occurs between the output shaft 12 (the wiper W) and the motor main body 92, the clutch device 60 (and the wiper motor apparatus having the clutch device 60) can be automatically returned to its initial position to connect the output shaft 12 (the wiper W) to the motor main body 92 at the predetermined point to resume the normal operation through rotation of the motor main body 92.

Furthermore, the projection 71, which engages the rotation limiter 144, 146 of the stopper projection 142, is formed in the peripheral wall 70 of the clutch base 62. That is, the component, which limits the reciprocal rotation of the clutch disk 64 (of the clutch base 62 and of the output shaft 12), is positioned at the location that is spaced as much as possible from the output shaft 12 in the radial direction. Thus, the accuracy of the limited angle (the limited angular range Y of the rotation limiters 144, 146), which is defined by the stopper projection 142 and the projection 71, is further improved.

As described above, the clutch device 60 (and the wiper motor apparatus having the clutch device 60) of the second embodiment achieves the advantages similar to those of the wiper motor apparatus 90 (the clutch device 10) of the first embodiment. In the case of the locking of the output shaft 12, it is possible to limit damage to each corresponding component and the burnout of the motor main body 92. Furthermore, even when relative rotation between the output shaft 12 (the driven side component) and the motor main body 92 (the driving side component) occurs, i.e., even when the clutch device 60 is declutched, the clutch device 60 is automatically returned to its initial position through rotation of the motor main body 92 (the driving side component) to reconnect the output shaft 12 (the driven side component) to the motor main body 92 (the driving side component) at the predetermined point to resume the normal operation.

Third Embodiment

Figure 21:
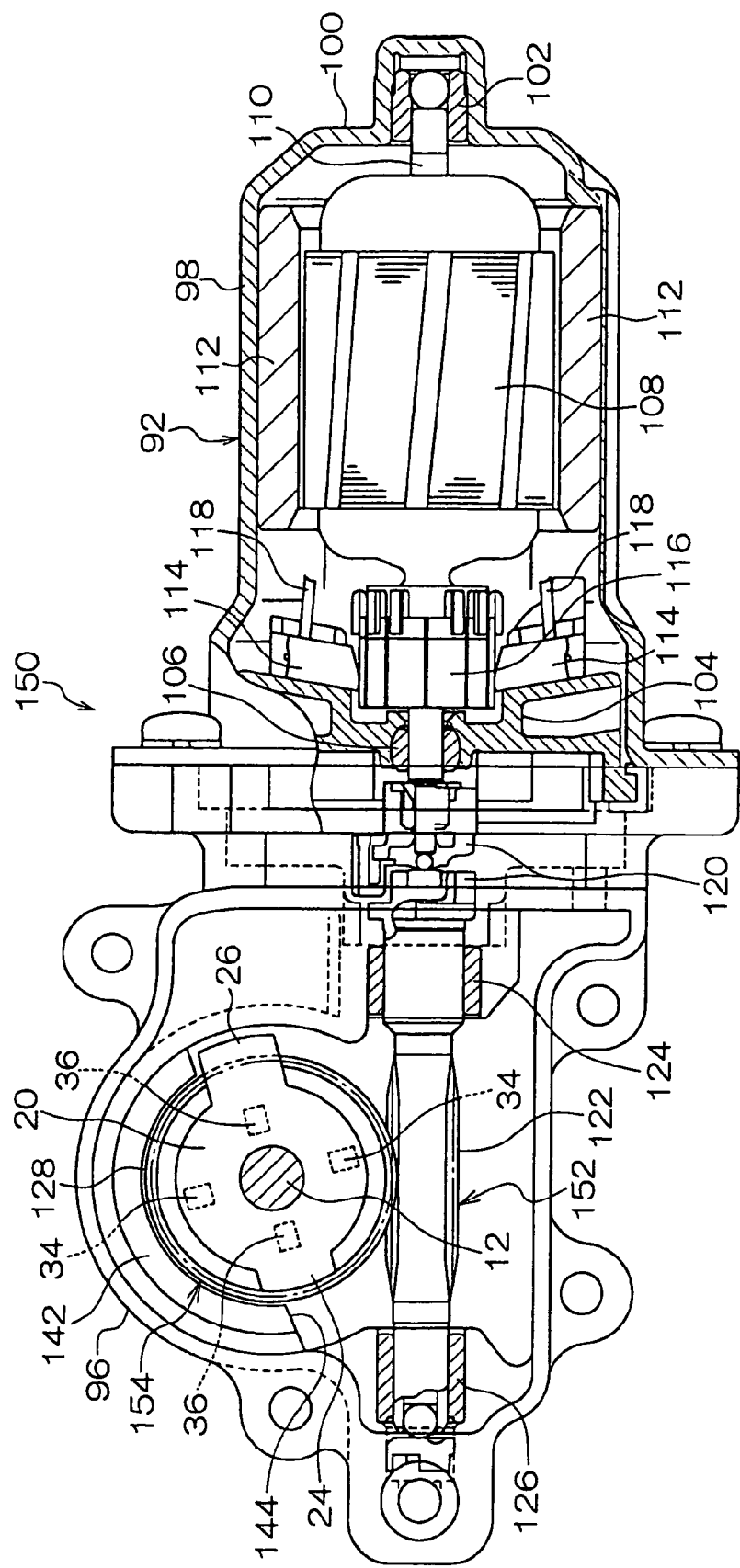
FIG. 21 is a plan view showing a structure of a motor apparatus according to a third embodiment of the present invention.

FIG. 21 is a cross sectional view of a motor apparatus 150 according to a third embodiment of the present invention.

The motor apparatus 150 has a structure, which is basically the same as that of the wiper motor apparatus 90 of the first embodiment. The motor apparatus 150 includes a motor main body 92, a motion converting mechanism 152 and a clutch device 154.

The motor main body 92 has the structure, which is substantially the same as that of the motor main body 92 of the first embodiment. In the first embodiment, the motor main body 92 (the armature 108) is rotated in the single direction. In contrast, in the present embodiment, the motor main body 92 is rotated in the normal direction and in the reverse direction between the rotation limiters 144, 146 of the stopper projection 142.

In the motion converting mechanism 152, the sector gear 132 and the holding lever 138 of the first embodiment are eliminated. Thus, the motor converting mechanism 152 includes the worm gear 122 and the worm wheel 128.

Furthermore, the worm wheel 128 also serves as an input disk of the clutch device 154. That is, the worm wheel 128 functions as the input disk (or the first rotatable member) of the clutch device 154. In other words, the clutch device 154 has the structure, which is basically the same as that of the clutch device 10 of the first embodiment. However, the clutch device 154 is constructed in such a manner that the input disk 28 of the first embodiment is provided with the worm teeth, which are meshed with the worm gear 122.

In this motor apparatus 150, when the motor main body 92 (the armature 108) is rotated, the rotational force is transmitted to the worm wheel 128 through the worm gear 122 to rotate the worm wheel 128.

Here, the worm wheel 128 serves as the input disk (or the first rotatable member) of the clutch device 154, i.e., the worm wheel 128 functions as the input disk (or the first rotatable member) of the clutch device 154. Thus, in the normal operation, as discussed with reference to the first embodiment, the output shaft 12 is rotated integrally with the worm wheel 128.

Even in this motor apparatus 150, at the time of transmitting the rotational drive force in the clutch device 154 in the normal operational state (the rotating state), the rotational drive force can be transmitted without causing sliding movement of any relevant components. Thus, a reduction in the transmission efficiency of the rotation can be limited. Furthermore, since the rotational drive force can be transmitted without causing the sliding movement of any relevant components, generation of a noise, which would be caused by the sliding movement of the relevant components, can be advantageously limited.

For example, when an excessively large external force (load) is applied to the output shaft 12, the output shaft 12 is reversely rotated or is arrested. Then, as discussed in the first embodiment, relative rotation occurs between the output shaft 12 and the worm wheel 128. In this way, it is possible to limit damage to each component of the clutch device 154, damage to each component of the motion converting mechanism 152, such as the worm gear 122 connected to the worm wheel 128, and burnout of the motor main body 92. Furthermore, it is not required to set the strength of each corresponding component upon consideration of the application of such an excessively large external force (load) to that component.

Furthermore, even in the motor apparatus 150 of the third embodiment, similar to the first embodiment, in the declutched state of the clutch device 154, i.e., in the state where relative rotation between the output shaft 12 and the motor main body 92 occurs, the clutch device 154 can be automatically reset to its initial position by rotating the motor main body 92 to reconnect the output shaft 12 to the motor main body 92 to resume the normal operation.

Furthermore, rotation of the worm wheel 128 (the input disk of the clutch device 154) is decelerated through engagement with the worm gear 122 provided to the rotatable shaft 110 of the motor main body 92. Thus, the output shaft 12 can be driven with a relatively large torque. Thus, the motor apparatus is suitable as a drive source of the wiper system or of the sunroof system.

Fourth Embodiment

Figure 22:
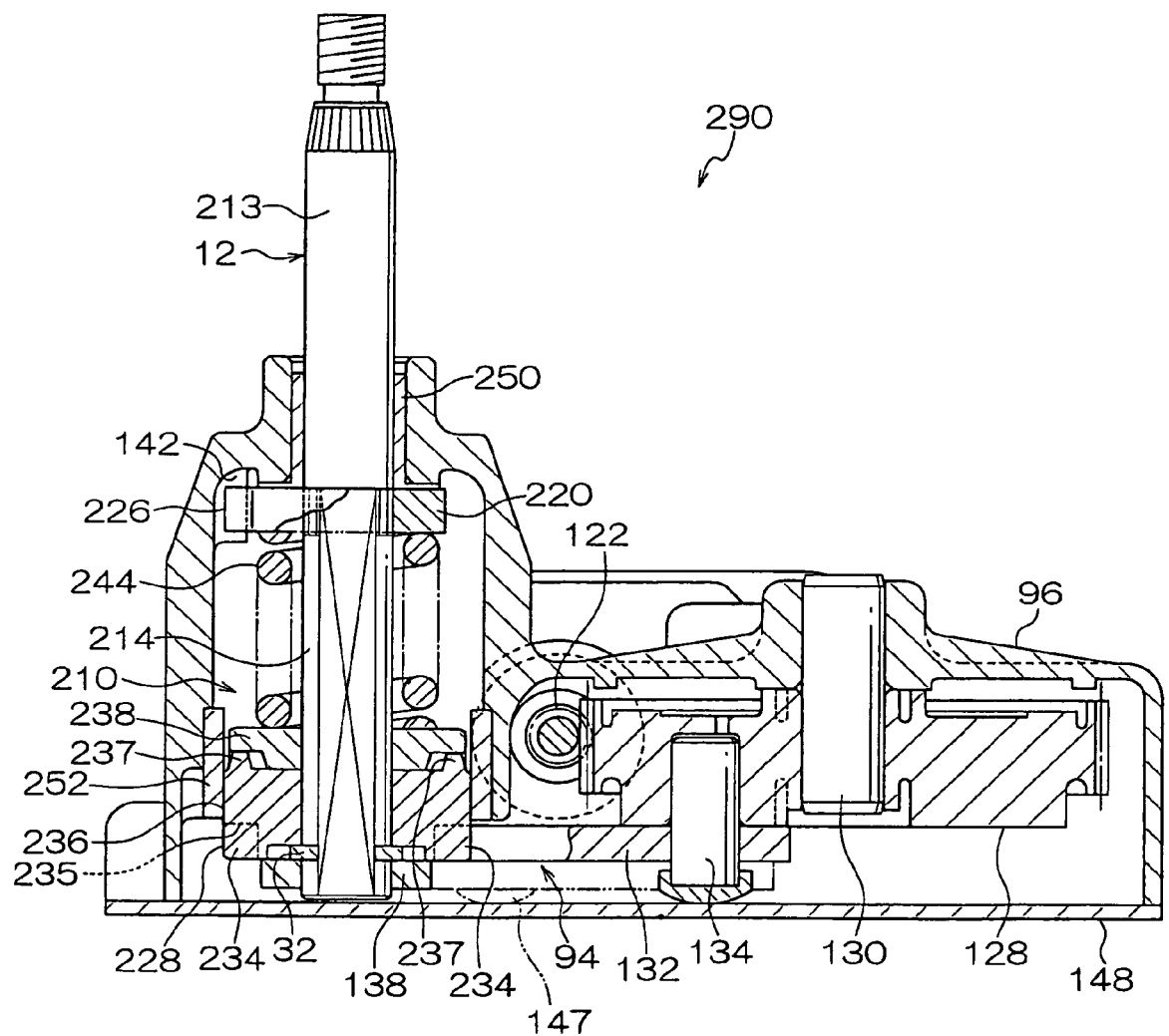
FIG. 22 is a cross sectional view showing an entire structure of a wiper motor apparatus having a clutch device according to a fourth embodiment of the present invention.

FIG. 22 is a cross sectional view showing a wiper motor apparatus 290, which has a clutch device 210 of a fourth embodiment of the present invention.

The wiper motor apparatus 290 has a structure, which is similar to that of the wiper motor apparatus 90 of the first embodiment and which includes the clutch device 210.

Figure 23:
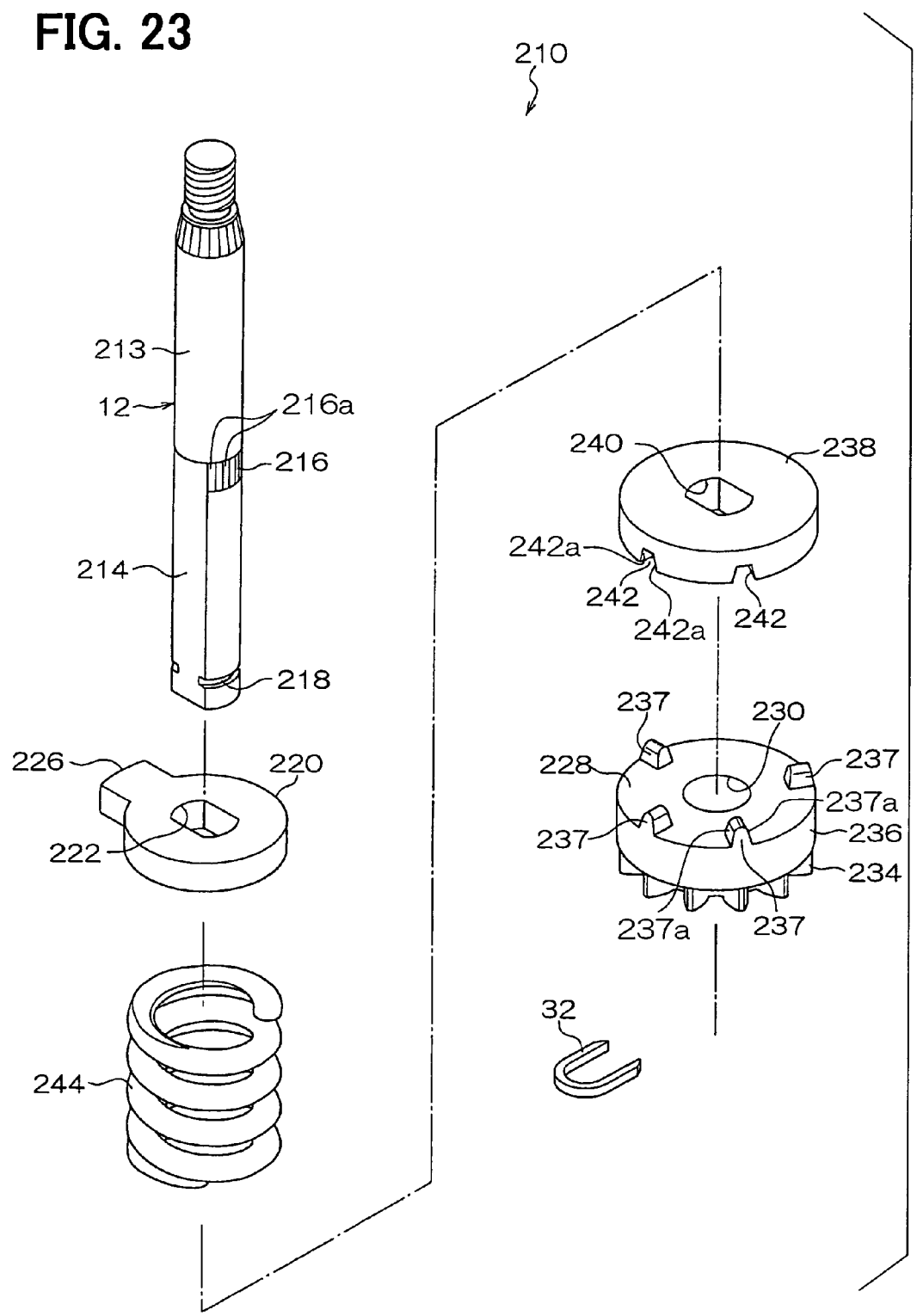
FIG. 23 is an exploded perspective view showing a structure of the clutch device of the fourth embodiment of the present invention.
Figure 24:
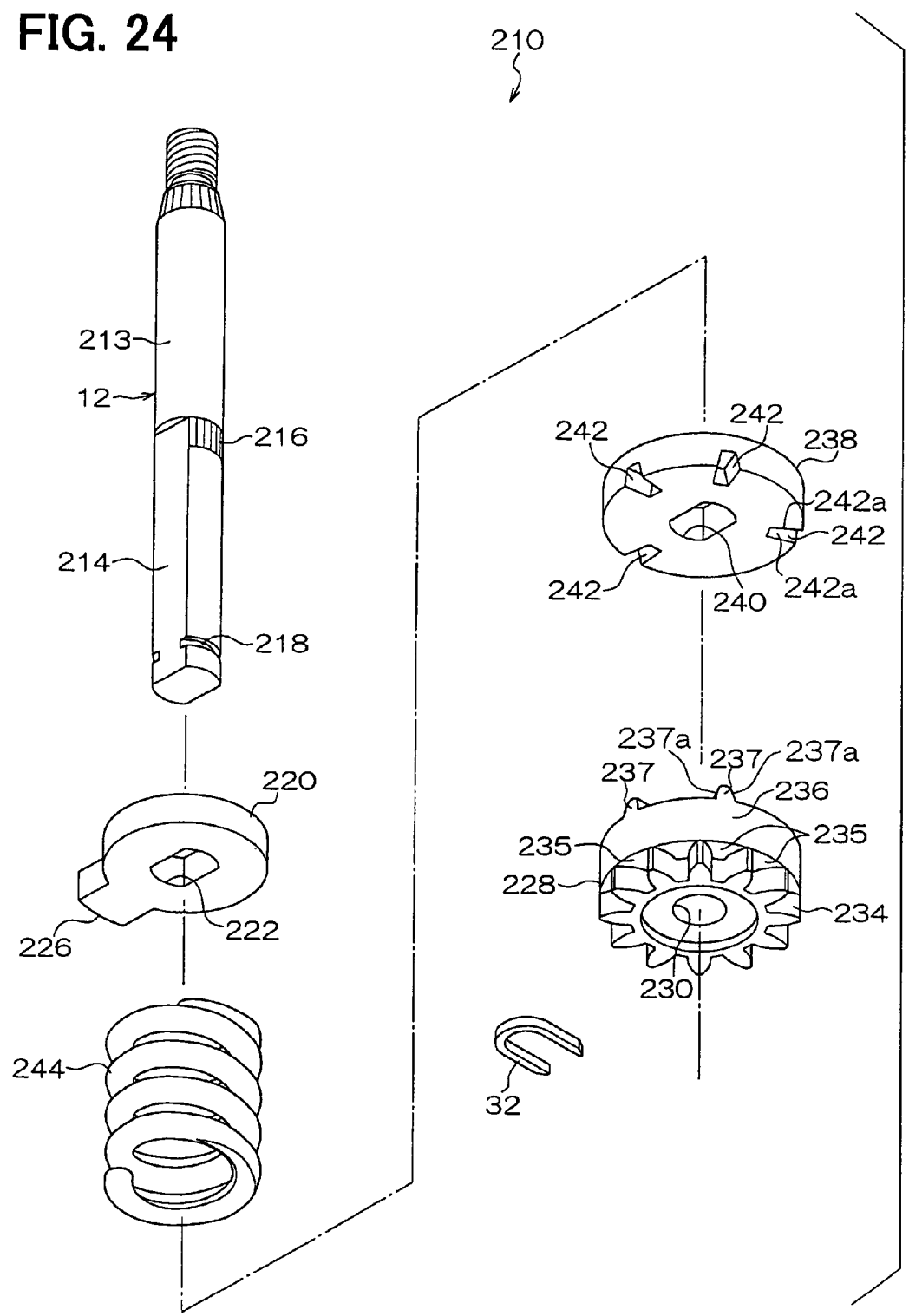
FIG. 24 is an exploded perspective view showing the structure of the clutch device of the fourth embodiment of the present invention.

As shown in FIGS. 23 and 24, the output shaft 12, to which the clutch device 210 is provided, includes a cylindrical portion 213 having a circular cross section at the distal end side (the upper side in FIGS. 23 and 24) of the output shaft 12. A base end side (the lower side in FIGS. 23 and 24) of the output shaft 12 includes a relative rotation limiting portion 214. The relative rotation limiting portion 214 has a generally rectangular cross section (having a double D-cut cross sectional shape including two flat surfaces, which are displaced from one another by 180 degrees in the circumferential direction, and two arcuate surfaces, which connect between the flat surfaces).

As shown in FIG. 22, the cylindrical portion 213 of the output shaft 12 is rotatably supported by a bearing member 250, which is secured to the housing 96. Axial ridges 216a are formed in the arcuate surfaces in a distal end side (a cylindrical portion 213 side) of the relative rotation limiting portion 214 to form a rotation restraining portion 216. A removal limiting portion 218 is formed in a base end of the relative rotation limiting portion 214.

An engaging base (the base member) 220, which serves as a large diameter portion having a large diameter in the radial direction of the output shaft 12, is secured to the rotation restraining portion 216 of the relative rotation limiting portion 214 by, for example, press fitting in a coaxial manner with respect to the output shaft 12. That is, the engaging base 220 is supported by the output shaft 12 in such a manner that the engaging base 220 is axially immovable relative to the output shaft 12 and is non-rotatable relative to the output shaft 12. The engaging base 220 is formed into a circular disk shaped body and has a support hole 222 in its center. The support hole 222 has a generally rectangular cross section (the double D-cut cross sectional shape), which corresponds to the relative rotation limiting portion 214 of the output shaft 12. When the support hole 222 is securely connected to the rotation restraining portion 216, the engaging base 220 rotates together with the output shaft 12 while being axially immobilized relative to the output shaft 12. Furthermore, a stopper portion 226 is formed in an outer peripheral edge of the engaging base 220 and protrudes in the radial direction (the radial direction of the output shaft 12). The stopper portion 226 corresponds to the stopper projection 142 formed in the housing 96.

The structure is not limited to the one, in which the output shaft 12 and the engaging base 220 are formed separately and thereafter securely connected together. For instance, it is possible to provide another structure, in which the output shaft 12 and the engaging base 220 are formed integrally through, for example, a cold forging process (the structure, in which the flange like large diameter portion is formed integrally in the output shaft).

A gear member 228, which serves as an input disk (or the first rotatable member), is installed to the removal limiting portion 218 of the relative rotation limiting portion 214 in a coaxial manner with respect to the output shaft 12. The gear member 228 is formed into a cylindrical body and has a circular shaft hole 230 in the center of the gear member 228. The removal limiting portion 218 of the output shaft 12 is received through the shaft hole 230, and the clip 32 is installed to the removal limiting portion 218. Thus, the gear member 228 is supported by the output shaft 12 at the one axial end side (the side opposite from the engaging base 220) in such a manner that the gear member 228 is non-detachable from the output shaft 12 in the axial direction of the output shaft 12 and is rotatable relative to the relative rotation limiting portion 214 of the output shaft 12. Therefore, in this case, the portion of the relative rotation limiting portion 214 of the output shaft 12, to which the gear member 228 is installed, serves as the relatively rotatable shaft portion of the output shaft 12, like the relatively rotatable shaft portion 18 of the first embodiment. In the fourth embodiment, the gear member 228 is a sintered metal product, which is formed by a powder metallurgy process in the following manner. That is, first, powder alloy is filled in a mold unit. Then, the powder alloy is molded in the mold unit by compression molding and is then sintered. The sintered metal product includes lubricant oil.

Gear teeth 234 are formed in an outer peripheral part of one axial end of the gear member 228, which is opposite from the engaging base 220. The gear teeth 234 are meshed with the toothed portion 136 of the sector gear 132 of the swing mechanism 94. When the drive force is supplied from the sector gear 132, the gear member 228 rotates about the output shaft 12.

Furthermore, as shown in FIG. 24, a connecting wall 235 is formed in the gear member 228 at the other axial end side of the gear teeth 234 (the engaging base 220 side that is opposite from the holding lever 138) to connect axial ends of the gear teeth 234 together. The connecting wall 235 and the holding lever 138 hold the toothed portion 136 of the sector gear 132 therebetween in the thickness direction of the toothed portion 136 of the sector gear 132. That is, the connecting wall 235 is opposed to the one end surface of the toothed portion 136 in the thickness direction, and the holding lever 138 is opposed to the other end surface of the toothed portion 136 in the thickness direction. Thus, movement of the sector gear 132 in the thickness direction is limited.

Furthermore, a cylindrical peripheral surface 236, which is coaxial with the output shaft 12, is formed in an outer peripheral part of the gear member 228, which is opposite from the gear teeth 234 with respect to the connecting wall 235. The cylindrical peripherals surface 236 is rotatably supported by a bearing member 252, which is secured to the housing 96. That is, on the other axial end side of the gear teeth 234, the gear member 228 has a circular disk shaped flange, which is coaxial with the output shaft 12, and the outer peripheral surface (the cylindrical peripheral surface 236) of this flange is supported by the bearing member 252.

Furthermore, four engaging projections (mating male portions or first side mating portions) 237 project toward the engaging base 220 in an outer peripheral edge of an end surface of the gear member 228, which is located on the other axial end side (the engaging base 220 side, i.e., the other axial end side of the output shaft 12). The engaging projections 237 are arranged in a coaxial manner with respect to the gear member 228 and are arranged at different intervals (each interval being different from its adjacent intervals) in the circumferential direction of the gear member 228. The engaging projections 237 correspond to engaging recesses (mating female portions or second side mating portions) 242 of an engaging plate 238, which will be described later.

The engaging plate 238, which serves as the clutch disk (or the second rotatable member), is supported by the relative rotation limiting portion 214 of the output shaft 12 between the engaging base 220 and the gear member 228 in such a manner that the engaging plate 238 is coaxial with the output shaft 12. The engaging plate 238 is formed as a circular disk and has a shaft hole 240 at its center. The shaft hole 240 has a generally rectangular cross section (the double D-cut cross sectional shape), which corresponds to the relative rotation limiting portion 214. When the shaft hole 240 receives the output shaft 12 (the relative rotation limiting portion 214), the engaging plate 238 is positioned on the other axial end side of the output shaft 12 (the engaging base 220 side) with respect to the gear member 228. The engaging plate 238 is supported by the output shaft 12 in such a manner that the engaging plate 238 is non-rotatable relative to the output shaft 12 and is axially movable relative to the output shaft 12. Thus, the engaging plate 238 rotates integrally with the output shaft 12 and is relatively movable with respect to the gear member 228 in the axial direction of the output shaft 12. In the fourth embodiment, the engaging plate 238 is a sintered metal product, which is formed through the powder metallurgy process described above and contains lubricant oil.

The four engaging recesses 242 are recessed in an outer peripheral part of a rear surface (a gear member 228 side, i.e., the one axial end side of the output shaft 12) of the engaging plate 238. The engaging recesses 242 correspond to the four engaging projections 237 of the gear member 228. Furthermore, the engaging recesses 242 are arranged in a coaxial manner with respect to the engaging plate 238 and are arranged at different intervals (each interval being different from its adjacent intervals) in the circumferential direction of the engaging plate 238.

The four engaging recesses 242 are engageable with the four engaging projections 237, respectively, of the gear member 228, i.e., the engaging plate 238 is engageable with the gear member 228. Therefore, in the normal operational state (the rotating state), when the gear member 228 is rotated, the rotational force of the gear member 228 is transmitted to the engaging plate 238. Thus, the engaging plate 238 is rotated together with the gear member 228.

However, as discussed above, the engaging projections 237 and the engaging recesses 242 are arranged at different intervals (each interval being different from its adjacent intervals) in the circumferential direction of the gear member 228 and of the engaging plate 238. Thus, the engaging plate 238 (the output shaft 12 and the wiper) and the gear member 228 are engaged with one another only at a predetermined single circumferential point. That is, in a circumferential point other than the predetermined single circumferential point, even when one of the engaging projections 237 coincides with, i.e., is aligned with one of the engaging recesses 242, the other three engaging projections 237 do not align with the other three engaging recesses 242. Thus, when the engaging projections 237 are displaced from the engaging recesses 242, the engaging plate 238 contacts the gear member 228 through at least three engaging projections 237 (providing three point support).

Furthermore, lateral walls 237a of the engaging portions 237 of the gear member 228 and lateral walls 242a of the engaging recesses 242 of the engaging plate 238 have slant surfaces. In other words, each of the engaging projections 237 of the gear member 228 has a trapezoidal cross section, and each of the engaging recesses 242 of the engaging plate 238 has a corresponding trapezoidal cross section. In this way, when the gear member 228 is rotated, a rotational force is transmitted from the gear member 228 to the engaging plate 238, and thus a force component is generated in the engaging plate 238 in the axial direction of the output shaft 12 toward the engaging base 220.

It should be understood that all of the lateral walls 237a of the engaging projections 237 of the gear member 228 and the lateral walls 242a of the engaging recesses 242 of the engaging plate 238 do not need to have the slant surfaces described above. For example, only one of the lateral walls 237a of each of the engaging projections 237 of the gear member 228 can be made as the slant surface, which is slanted in the circumferential direction or is slanted relative to the circumferential direction. Also, only one of the lateral walls 242a of each of the engaging recesses 242 of the engaging plate 238 can be made as the slant surface, which is slanted in the circumferential direction or is slanted relative to the circumferential direction. Even with this structure, the force component can be generated in the engaging plate 238 in the axial direction of the output shaft 12 upon transmission of the rotational force from the gear member 228 to the engaging plate 238.

Furthermore, a compression coil spring 244 is arranged between the engaging plate 238 and the engaging base 220. The coil spring 244 is spirally wound around the output shaft 12 and is compressible in the axial direction of the output shaft 12. The coil spring 244 applies a predetermined resistive force (a predetermined restoring force generated upon resilient deformation of the coil spring 244 through the axial movement of the engaging plate 238) against axial movement of the engaging plate 238 toward the other output shaft 12 axial end side (the engaging base 220 side) from the engaged state, in which the engaging projections 237 of the gear member 228 and the engaging recesses 242 of the engaging plate 238 are engaged with one another.

In other words, normally, the engaging projections 237 of the gear member 228 are engaged with, i.e., are received in the engaging recesses 242 of the engaging plate 238, and the coil spring 244 maintains this engaged state. When the engaging projections 237 of the gear member 228 try to move away from the engaging recesses 242 of the engaging plate 238, the engaging plate 238 tries to axially move toward the engaging base 220. The coil spring 244 provides the resistive force (the restring force) against this axial movement of the engaging plate 238.

Furthermore, as described above, when the engaging projections 237 of the gear member 228 are received in, i.e., are engaged with the engaging recesses 242 of the engaging plate 238, the rotational force is transmitted from the gear member 228 to the engaging plate 238. However, even when the engaging projections 237 of the gear member 228 are disengaged from the engaging recesses 242 of the engaging plate 238, i.e., even when the engaging plate 238 is moved toward the engaging base 220, a predetermined frictional force is generated between the engaging projections 237 of the gear member 228 and the rear surface of the engaging plate 238 due to the urging force (the restoring force) generated by the coil spring 244. Therefore, the engaging plate 238 is rotated together with the gear member 228 due to the frictional force of the coils spring 244. The urging force of the coil spring 244 is set to achieve this rotation of the engaging plate 238 together with the gear member 228 even in the disengaged state.

In the normal state, i.e., the state where the engaging plate 238 does not try to move toward the engaging base 220, the coil spring 244 may always exert an appropriate urging force between the engaging base 220 and the engaging plate 238. Alternatively, the coil spring 244 may exert the above urging force (the restoring force) only when the engaging plate 238 tries to move toward the engaging base 220, i.e., only when the engaging projections 237 try to disengage from the engaging recesses 242.

As shown in FIG. 22, the above-described stopper projection 142 is formed in the housing 96 to correspond with the stopper portion 226 of the engaging base 220.

The stopper projection 142 is formed as the arcuate body and is located in a rotational moving path of the stopper portion 226, along which the stopper portion 226 moves during the rotation of the engaging base 220. One circumferential end of the stopper projection 142 forms the rotation limiter 144, and the other circumferential end of the stopper projection 142 forms the rotation limiter 146. That is, each of the rotation limiters 144, 146 of the stopper projection 142 can engage the stopper portion 226. When the stopper portion 226 engages the rotation limiter 144 or the rotation limiter 146 of the stopper projection 142, further rotation of the engaging base 220 (the output shaft 12) is limited. Thus, at the time of rotating the engaging base 220 (the output shaft 12) together with the engaging plate 238 through application of the rotational drive force of the gear member 228 to the engaging base 220 (the output shaft 12), when the stopper portion 226 engages the rotation limiter 144 or the rotation limiter 146 of the stopper projection 142, further rotation of the engaging base 220 (the output shaft 12) is forcefully limited. Thus, relative rotation between the gear member 228 and the engaging base 220 (the output shaft 12) occurs.

The wiper (not shown) may be directly connected to the output shaft 12, which is reciprocally rotated by the gear member 228. Alternatively, the wiper (not shown) may be indirectly connected to the output shaft 12 through a link or a rod. Thus, the wiper is reciprocally swung by the reciprocal rotation of the output shaft 12.

Next, operation of the fourth embodiment will be described.

In the wiper motor apparatus 290, when the motor main body 92 (the armature 108) is rotated, the rotational force is transmitted to the worm wheel 128 through the worm gear 122 to rotate the worm wheel 128. When the worm wheel 128 is rotated, the sector gear 132, which is connected to the worm wheel 128, is reciprocally swung. Then, the reciprocal swing motion of the sector gear 132 causes reciprocal rotation of the gear member 228.

In the normal operational state, the engaging projections 237 of the gear member 228 are engaged with the engaging recesses 242 of the engaging plate 238. Furthermore, even when the engaging plate 238 tries to move in the axial direction of the output shaft 12 from the engaged state, in which the engaging projections 237 are engaged with the engaging recesses 242, the predetermined resistive force is applied from the coil spring 244 to the engaging plate 238. Thus, the engaged state is maintained. Furthermore, the engaging plate 238 is not rotatable about the axis of the output shaft 12 relative to the output shaft 12. Thus, when the gear member 228 is reciprocally rotated, the rotational drive force is transmitted from the gear member 228 to the engaging plate 238 through the engaging projections 237 and the engaging recesses 242. Thus, the output shaft 12 is rotated integrally with the engaging plate 238.

In this way, the wiper, which is connected to the output shaft 12, is reciprocally swung upon reciprocal rotation of the output shaft 12.

For example, when an excessively large external force (load) is applied to the output shaft 12 through the wiper, the output shaft 12 is reversely rotated or is arrested. Then, the engaging plate 238, which is rotated together with the output shaft 12, receives the rotational force in the direction that causes the rotation of the engaging plate 238 relative to the gear member 228. Since the lateral walls 237a of the engaging projections 237 of the gear member 228 and the lateral walls 242a of the engaging recesses 242 of the engaging plate 238 have the slant surfaces (i.e., having the trapezoidal cross section), the force component is generated in the engaging plate 238 in the axial direction of the output shaft 12 toward the engaging base 220 due to the relative rotational force generated by the relative rotation between the gear member 228 and the engaging plate 238. That is, a portion of the relative rotational force generated by the relative rotation between the gear member 228 and the engaging plate 238 serves as the force component, which moves the engaging plate 238 in the axial direction of the output shaft 12 to release the engagement between the engaging projections 237 of the gear member 228 and the engaging recesses 242 of the engaging plate 238. When this relative rotational force (the force component) becomes equal to or greater than a predetermined value, the engaging plate 238 overcomes the resistive force of the coil spring 244 and is thus forcefully moved in the axial direction of the output shaft 12 to release the above engagement between the engaging projections 237 of the gear member 228 and the engaging recesses 242 of the engaging plate 238. In this way, the engaging plate 238, i.e., the output shaft 12 is rotated relative to the gear member 228.

Thus, in the state where the wiper is frozen to the wiping glass surface in the normal stop position in the rotational angular range or in the state where heavy snow is accumulated on the wiper held in the normal stop position to arrest the wiper, when the motor main body 92 of the wiper motor apparatus 290 is rotated to apply excessively large load or sudden load, the clutch device 210 is declutched. Also, during the operation of the wiper within the rotational angular range (the normal wiping range) of the wiper, when an excessively large force is applied to the output shaft 12 through the wiper, for example, when heavy snow accumulated on the roof of the vehicle falls along the glass surface onto the wiper, which is placed at a position other than the lower turning point at the time of wiping movement of the wiper, the clutch device 210 is declutched. Thus, it is possible to limit application of excessively large force to the drive force transmitting components (the components, such as the sector gear 132, the worm wheel 128, the worm gear 122 and the motor main body 92, which are located between the output shaft 12 and the armature 108) other than the gear member 228. In this way, each component, which is located after the gear member 228, can be protected. Thus, it is possible to limit damage to each above component and the burnout of the motor main body 92.

Furthermore, it is only required to set the strength of each component located after the gear member 228 based on the rotation transmitting force (the declutching force) between the gear member 228 and the engaging plate 238. Thus, it is not required to set the excessive strength of each component upon consideration of the excessively large external force (load). As a result, manufacturing costs can be reduced.

Furthermore, the driven component (e.g., the wiper), which is connected to the output shaft 12, can be also protected since the declutching of the clutch device 210 causes absorption of shocks applied to the driven component (e.g., the wiper).

In the wiper motor apparatus 290, the shaft 140, which serves as a swing center axis of the sector gear 132, and the output shaft 12 are connected to each other through the holding lever 138 arranged on one side of the sector gear 132 in the thickness direction of the sector gear 132. Thus, a shaft-to-shaft distance (a shaft-to-shaft pitch) between the shaft 140, which serves as the swing center axis of the sector gear 132, and the output shaft 12 is kept constant. Furthermore, the toothed portion 136 of the sector gear 132 is held between the holding lever 138 located on one side and the connecting wall 235 of the gear member 228 located on the other side (the engaging plate 238 side) in the thickness direction of the sector gear 132. Thus, the engagement between the gear teeth 136 and the toothed portion 234 in the thickness direction of the sector gear 132 is limited, i.e., wobbling of the sector gear 132 in the thickness direction of the sector gear 132 is limited without requiring two holding members (the holding levers) on both sides of the sector gear 132 in the thickness direction of the sector gear 132. In this way, appropriate engagement between the sector gear 132 and the gear member 228 is maintained.

Furthermore, in the wiper motor apparatus 290, the holding lever 138 is arranged on the opposite side of the sector gear 132, which is opposite from the worm wheel 128 in the thickness direction of the sector gear 132. Thus, the holding lever 138 does not interfere with the worm wheel 128. Therefore, a degree of freedom in terms of designing the connecting position between the sector gear 132 and the worm wheel 128 is improved, i.e., a degree of freedom in terms of designing the installation position of the support shaft 134 relative to the worm wheel 128 is improved.

Furthermore, in the wiper motor apparatus 290, unlike the previously proposed wiper motor apparatus, the holding members (the holding levers) are not provided on the opposite sides, respectively, of the sector gear 132 in the thickness direction of the sector gear 132. That is, in the wiper motor apparatus 290, the single holding lever 138 is arranged only on the one side of the sector gear 132 in the thickness direction of the sector gear 132. Thus, a space for accommodating the holding member can be reduced. Therefore, the size and weight of the entire device structure can be reduced.

As described above, in the wiper motor apparatus 290 of the fourth embodiment, the appropriate engagement between the sector gear 132 and the gear member 228 is maintained, and the size of the device can be reduced.

Furthermore, in the case of the previously proposed wiper motor apparatus, which has the holding members arranged on the opposite sides, respectively, of the sector gear in the thickness direction of the sector gear (the opposite sides of the gear member), one of the holding members prevents engagement of the engaging plate of the clutch device to the gear member. However, in the wiper motor apparatus 290, the holding lever 138 is provided only on the opposite side of the sector gear 132, which is opposite from the engaging plate 238 in the thickness direction of the sector gear 132 (the thickness direction of the gear member 228). Thus, the holding lever 138 does not prevent the engagement of the gear member 228 with the engaging plate 238. Therefore, the positional limitations of the clutch device 210 are alleviated.

Furthermore, in the wiper motor apparatus 290, the engaging base 220 (the large diameter portion) is securely connected to the rotation restraining portion 216 of the output shaft 12, in which the ridges are formed. The engaging base 220 is securely connected to the rotation restraining portion 216 of the output shaft 12 particularly in the rotational direction about the axis. Removal of the gear member 228 from the output shaft 12 is limited by the removal limiting portion 218 of the output shaft 12. The engaging plate 238 is axially moveably supported by the relative rotation limiting portion 214 of the output shaft 12 between the engaging base 220 and the gear member 228. Thus, each corresponding component is installed to the output shaft 12, and the engaging plate 238 and the coil spring 244 are arranged in the predetermined space (the predetermined dimension) between the engaging base 220 and the gear member 228. As a result, as discussed above, the force (the declutching force), which is required to axially move the engaging plate 238, can be easily set.

Furthermore, in the wiper motor apparatus 290, since the coil spring 244 is formed as the resilient member, the stable spring characteristic is achieved. That is, in the case where the rubber member is formed as the resilient member, the grease or the like applied to the clutch device 210 could be adhered to the rubber member to deteriorate the rubber member. However, in the case of the coil spring 244, the coil spring 224 is not deteriorated by the grease or the like adhered to the coil spring 224, so that the spring characteristic of the coil spring 224 is stabilized.

Also, the coil spring 244 is spirally wound around the output shaft 12 and is arranged between the engaging plate 238 and the engaging base 220, which has the large diameter in the radial direction of the output shaft 12 and is axially immovable. Thus, the engaging plate 238 can be urged against the gear member 228 in the stable manner, and the stable resistive force can be applied. That is, the engaging plate 238 can uniformly disperse the resilient force of the coil spring 244 in the engaged portion or the connection between the gear member 228 and the engaging plate 238. Thus, the engagement between the gear member 228 and the engaging plate 238 is stabilized, and the rotation transmitting force (the declutching force) between the gear member 228 and the engaging plate 238 is stabilized. Therefore, the stable clutch performance can be achieved, and the declutching force can be appropriately set. As a result, each component of the wiper motor apparatus 290 can be more reliably protected.

Furthermore, in the wiper motor apparatus 290, the gear member 228, which is supported by the output shaft 12, has the outer peripheral part, which is opposite from the gear teeth 234 with respect to the connecting wall 235 and is formed as the cylindrical peripheral surface 236. The cylindrical peripheral surface 236 is rotatably supported by the bearing member 252, which is secured to the housing 96. That is, in the wiper motor apparatus 290, the gear member 228, which receives the load from the sector gear 132, is directly supported by the bearing member 252 of the housing 96. Thus, the supporting structural rigidity of the gear member 228 is improved. In this way too, the engagement between the gear member 228 and the sector gear 132 is stabilized. Furthermore, the base end portion of the output shaft 12 is supported by the housing 96 (the bearing member 252) through the gear member 228. Thus, a dedicated space for supporting the base end portion of the output shaft 12 relative to the housing 96 is not required. In other words, the accommodating space for accommodating the gear member 228 and the support space for supporting the base end portion of the output shaft 12 are common. Furthermore, there is provided a relatively long axial distance measured in the axial direction of the output shaft 12 between the bearing member 252, which supports the base end portion of the output shaft 12, and the bearing member 250, which supports the distal end portion of the output shaft 12. In this way, the supporting structural rigidity of the output shaft 12 relative to the housing 96 is improved.

Furthermore, in the wiper motor apparatus 290, each of the gear member 228 and the engaging plate 238 is made as the sintered metal product, which is made through molding of the powder alloy. Thus, the gear member 228 and the engaging plate 238 can be formed through the powder metallurgy process with the high accuracy and with the good yield of the material. Also, the gear member 228 and the engaging plate 238, which are made as the sintered metal products, contain the lubricant oil in the sintered metal. Thus, self-lubrication is achieved in the engaged portions (e.g., the engaging projections 237 and the engaging recesses 242) between the gear member 228 and the engaging plate 238. Furthermore, self-lubrication is also achieved in the gear teeth 234 of the gear member 228, which are engaged with the toothed portion 136 of the sector gear 132, to limit wearing and generation of noises.

Furthermore, in the wiper motor apparatus 290, the engaging projections 237 of the gear member 228 are arranged at different intervals (each interval being different from its adjacent intervals) in the circumferential direction of the gear member 228, and the engaging recesses 242 of the engaging plate 238 are arranged at different intervals (each interval being different from its adjacent intervals) in the circumferential direction of the engaging plate 238. In the declutched state where each engaging projection 237 is removed from the corresponding engaging recess 242, the engaging plate 238 engages the gear member 228 through at least three engaging projections 237 (achieving the three point support). Thus, the engaged state between the engaging plate 238 and the gear member 228 is stabilized in the declutched state.

Also, the gear member 228 and the engaging plate 238 (the output shaft 12 and the wiper) are engaged with one another only in the predetermined single circumferential point. Thus, in the declutched state where the gear member 228 and the engaging plate 238 are placed in a position, which is other than the predetermined single point, and thus each engaging projection 237 is removed from the corresponding engaging recess 242, when the wiper is manually rotated by, for example, a vehicle occupant, the gear member 228 and the engaging plate 238 are engaged with one another always at the predetermined single point. Thus, the engaging plate 238 (the output shaft 12 and the wiper) can be easily and rapidly returned to the originally set state (initially set state) relative to the gear member 228. Also, the wiper system can be operated once again without damaging the wiper system. Particularly, in the case where the above predetermined single point is set to be the predetermined single point in the reciprocal rotational angular range (the reciprocal rotational wiping angular range), which is set to be smaller than the limited angular range that is limited by the rotation limiters 144, 146 of the stopper projection 142, when the wiper system resumes its operation upon removal of the excessively large external force, the gear member 228 and the engaging plate 238 reengage with one another within a single reciprocal wiping movement of the wiper to achieve the self-recovery.

Furthermore, in the clutch device 210 of the wiper motor apparatus 290, the gear member 228 is reciprocally rotated at the reduced speed by the swing mechanism 94 (the worm gear 122, the worm wheel 128 and the sector gear 132). Thus, the output shaft 12 can be driven by the relatively large torque. Therefore, the wiper, which is connected to the output shaft 12, can be appropriately reciprocally driven.

Therefore, the wiper motor apparatus 290 is also suitable as the wiper motor apparatus of the vehicle, such as the truck or the constructor having the cab-over type cockpit, which will likely have an excessively large force (load) on the output shaft 12 through the wiper at the time of, for example, application of heavy snow, which is accumulated on the roof of the vehicle, to the wiper arm and thus to the wiper motor apparatus 290 upon vertical falling of the heavy snow along the glass surface.

Furthermore, in the clutch device 210 of the wiper motor apparatus 290, the engaging projections 237 of the gear member 228 are received in the engaging recesses 242 of the engaging plate 238 to transmit the rotational force from the gear member 228 to the engaging plate 238. Thus, the transmission of the drive force between the gear member 228 and the engaging plate 238 is reliably carried out. In addition, the lateral walls 237a of the engaging projections 237 of the gear member 228 and the lateral walls 242a of the engaging recesses 242 of the engaging plate 238 have the slant surfaces, so that the declutching force can be easily set based on the angle of the slant surface and the resistive force (resiliently deforming force) of the coil spring 244.

Furthermore, in the wiper motor apparatus 290, in the normal operational state (the rotating state), as discussed above, at the time of transmitting the rotational drive force from the gear member 228 to the output shaft 12, the rotational drive force can be transmitted without causing sliding movement at any relevant part. More specifically, the resistive force of the coil spring 244, which is applied against the axial movement of the engaging plate 238 from the engaged state of the engaging plate 238 to maintain the engaged state between the engaging projections 237 of the gear member 228 and the engaging recesses 242 of the engaging plate 238, is not wasted as the sliding frictional force. Thus, it is possible to limit a reduction in the transmission efficiency of the rotation. Furthermore, the rotational drive force can be transmitted without causing sliding movement of the corresponding component, so that generation of a noise, which would be generated by the sliding movement of the corresponding component, can be advantageously limited.

Furthermore, as discussed above, the resistive force of the coil spring 244, which is applied against the axial movement of the engaging plate 238 from the engaged state to maintain the engagement between the engaging projections 237 and the engaging recesses 242, is received by the engaging base 220, which is secured to the output shaft 12, and is also received by the gear member 228, which is supported by the output shaft 12 in a manner that limits axial removal of the gear member 228 from the output shaft 12. That is, the force for maintaining the engaged state is supported by the two constituent components, i.e., the engaging base 220 and the gear member 228, which are installed to the output shaft 12. In other words, the clutch device 210 is formed as a complete sub-assembly of the output shaft 12, which does not require any additional component, such as a housing 96, to serve as the sub-assembly. Thus, the clutch device 210 can be handled as the single component, which is formed as the sub-assembly of the output shaft 12.

As described above, in the wiper motor apparatus 290 (the clutch device 210) of the fourth embodiment, it is possible to maintain the appropriate engagement between the sector gear 132 and the gear member 228, and the size of the device can be reduced.

In the fourth embodiment, the gear member 228 and the engaging plate 238 are made as the sintered metal products, which contain the lubricant oil. However, the present invention is not limited to this. For example, only one of the gear member 228 and the engaging plate 238 can be made as the sintered metal product, which contains the lubricant oil.

Furthermore, in the fourth embodiment, the wiper motor apparatus 290 includes both the swing mechanism 94 and the clutch device 210. However, the present invention is not limited to this. For example, the clutch device can be eliminated from the wiper motor apparatus. In such a case, the gear member should be provided integrally in the output shaft in an axially non-movable manner relative to the output shaft.

In the above embodiments, the first side mating portions 34, 36, 237 of the input disk 28, 128, 228 are formed as the mating male portions 34, 36, 237, which project in the axial direction of the output shaft 12. Also, the second side mating portions 50, 52, 242 of the clutch disk 38, 64, 238 are formed as the mating female portions 50, 52, 242, which are recessed in the axial direction of the output shaft 12. However, the present invention is not limited to this structure. For example, the first side mating portions 34, 36, 237 of the input disk 28, 128, 228 may be formed as recesses, which are recessed in the input disk 28, 128, 228 in the axial direction of the output shaft. Also, the second side mating portions 50, 52, 242 of the clutch disk 38, 64, 238 may be formed as projections, which project from the clutch disk 38, 64, 238 in the axial direction of the clutch disk 38, 64, 238.

Also, in the above embodiments, when the load applied to the output shaft 12 is equal to or greater than the predetermined value, the input disk and the clutch disk are decoupled from one another, so that the relative rotation is made between the input disk and the clutch disk. It should be noted that this excessive load includes the excessive load applied to the rotating output shaft as well as the excessive load applied to the stationary output shaft (e.g. the excessive load applied to the output shaft, which is connected to, for example, the wiper that is frozen to the window glass during the winter season) at the time of rotating the input disk.

Additional advantages and modifications will readily occur to those skilled in the art. The invention in its broader terms is not limited to the above specific details, representative apparatus, and illustrative examples. Also, any component(s) of any one of the above embodiments can be combined with or replaced with any other component(s) of any other embodiments.

What is claimed is:

1. A motor apparatus comprising:
   clutch device that includes:
   a first rotatable member, which is reciprocally rotated by a drive force applied thereto;
   a second rotatable member, which is coupleable with the first rotatable member at a maximum rotational coupling force to rotate integrally with the first rotatable member without making relative rotation between the first rotatable member and the second rotatable member at the time of reciprocally rotating the first rotatable member;
   an output shaft, which is connected to the second rotatable member to rotate integrally with the second rotatable member, wherein the output shaft is normally rotatable within a predetermined normal reciprocal rotational angular range;
   at least one rotation limiter, which limits reciprocal rotation of the output shaft beyond a limited angular range, which is larger than the normal reciprocal rotational angular range of the output shaft, wherein:
   initiation of the coupling between the first rotatable member and the second rotatable member at the maximum rotational coupling force without making the relative rotation between the first rotatable member and the second rotatable member is enabled only when the output shaft is placed in a single engageable point within the normal reciprocal angular range of the output shaft; and
   when a load applied to the output shaft is equal to or greater than a predetermined value, the first rotatable member and the second rotatable member are decoupled from one another, so that the relative rotation is made between the first rotatable member and the second rotatable member;
   a housing, which receives the clutch device; and
   a motor maim body, which is connected to the clutch device to supply the drive force to the first rotatable member of the clutch device, wherein:
   the housing includes a stopper projection, which is formed integrally inside the housing at an inner surface of the housing where the clutch device is received;
   the at least one rotation limiter is formed integrally in the stopper projection of the housing; and
   when at least one of the second rotatable member and the output shaft is directly or indirectly engaged with one of the at least one rotation limiter formed integrally in the stopper projection, the reciprocal rotation of the second rotatable member is limited.

2. The motor apparatus according to claim 1, wherein:
   the first rotatable member, the second rotatable member and the output shaft are coaxial;
   the second rotatable member is axially displaceable relative to the first rotatable member;
   when the first rotatable member and the second rotatable member are coupled to one another at the maximum rotational coupling force without making the relative rotation between the first rotatable member and the second rotatable member, the second rotatable member is placed in a first axial position; and
   when the first rotatable member and the second rotatable member are decoupled from one another to make the relative rotation between the first rotatable member and the second rotatable member, the second rotatable member is placed in a second axial position, which is displaced from the first axial position.

3. The motor apparatus according to claim 1, wherein the engageable point is located within a corresponding angular range, which begins from at least one of circumferential ends of the limited angular range and has an angular extent that is equal to a normal reciprocal rotational angle of the output shaft.

4. The motor apparatus according to claim 1, wherein:
the normal reciprocal rotational angular range of the output shaft is about 170 degrees; and
the limited angular range is about 180 degrees.

5. The motor apparatus according to claim 1, wherein:
the first rotatable member is supported by the output shaft on one output shaft end side of the output shaft in such a manner that the first rotatable member is axially non-detachable from the output shaft and is reciprocally rotatable about an axis of the output shaft;
the first rotatable member has at least one first side mating portion;
the second rotatable member is located on the other output shaft end side of the output shaft with respect to the first rotatable member and is supported by the output shaft in such a manner that the second rotatable member is non-rotatable relative to the output shaft and is axially movable relative to the output shaft;
the second rotatable member has at least one second side mating portion that is engaged with the at least one first side mating portion of the first rotatable member in an axial direction of the output shaft at the single engageable point to achieve the coupling between the first rotatable member and the second rotatable member at the maximum rotational coupling force without making the relative rotation between the first rotatable member and the second rotatable member; and
the clutch device further comprises at least one resilient member, which is arranged on the other output shaft end side of the second rotatable member and applies a resistive force against the axial movement of the second rotatable member toward the other output shaft end side from a coupled state, at which the at least one first side mating portion and the at least one second side mating portion are engaged with one another to rotate together.

6. The motor apparatus according to claim 5, wherein:
the at least one first side mating portion includes a first pair of first side mating portions and a second pair of first side mating portions;
the first side mating portions of the first pair are displaced about 180 degrees from one another in a circumferential direction of the first rotatable member;
the first side mating portions of the second pair are displaced about 180 degrees from one another in the circumferential direction of the first rotatable member; and
the first pair of first side mating portions is located outward beyond the second pair of first side mating portions in a radial direction of the first rotatable member.

7. The motor apparatus according to claim 5, wherein:
the output shaft includes a base member, which is engaged with the second rotatable member to rotate the second rotatable member integrally with the base member;
one of the second rotatable member and the base member includes at least one fitting male portion, which projects in a radial direction of the output shaft; and
the other one of the second rotatable member and the base member includes a peripheral wall, which extends in the axial direction of the output shaft, wherein the peripheral wall has at least one fitting female guide portion, which receives the at least one fitting male portion in the axial direction of the output shaft in such a manner that the at least one fitting male portion is axially movable relative to the at least one fitting female guide portion.

8. The motor apparatus according to claim 7, wherein:
the at least one fitting male portion projects radially outward of the one of the second rotatable member and the base member;
the at least one rotation limiter is located in a rotational moving path of one of the at least one fitting male portion; and
the one of the at least one fitting male portion is directly or indirectly engageable with the at least one rotation limiter to limit the reciprocal rotation of the output shaft beyond the limited angular range.

9. The motor apparatus according to claim 5, further comprising a base member, which is supported by the output shaft in such a manner that the base member is axially immovable relative to the support shaft and is non-rotatable relative to the output shaft, wherein:
the base member includes a stopper portion, which projects radially outward from the base member;
the stopper portion of the base member is directly or indirectly engageable with the at least one rotation limiter to limit the reciprocal rotation of the output shaft beyond the limited angular range; and
the at least one resilient member includes a compression coil spring, which is spirally wound about the axis of the output shaft between the second rotatable member and the base member and is arranged in a compressed state.

10. The motor apparatus according to claim 1, wherein the second rotatable member is also coupleable with the first rotatable member at a reduced rotational coupling force, which is smaller than the maximum rotational coupling force, to rotate along with the first rotatable member at the time of reciprocally rotating the first rotatable member.

11. The motor apparatus according to claim 1, further comprising a worm gear, which is provided to a rotatable shaft of the motor main body to rotate integrally with the rotatable shaft, wherein the first rotatable member of the clutch device is directly meshed with the worm gear and is rotated at a decelerated speed.

12. The motor apparatus according to claim 1, wherein:
the housing rotatably supports the output shaft;
one of the first rotatable member and the second rotatable member of the clutch device has a diameter larger than that of the other one of the first rotatable member and the second rotatable member and has a cylindrical peripheral surface, which is coaxial with the output shaft; and
a bearing member is secured to the housing to rotatably support the cylindrical peripheral surface of the one of the first rotatable member and the second rotatable member.

13. The motor apparatus according to claim 1, wherein:
the motor apparatus is for a wiper system, which includes a wiper; and
the motor apparatus further comprises a motion converting mechanism that includes:
a worm gear, which is provided to a rotatable shaft of the motor main body to rotate integrally with the rotatable shaft;
a worm wheel, which is meshed with the worm gear and rotates about a rotational axis, which extends in a direction perpendicular to an axis of the rotatable shaft; and
a swing member, which has one end connected to the worm wheel at a position spaced from the rotational axis of the worm wheel and has the other end engaged with the first rotatable member of the clutch device, wherein the swing member is reciprocally swung by rotation of the worm wheel to reciprocally rotate the first rotatable member and thereby to reciprocally drive the wiper, which is directly or indirectly connected to the output shaft.

14. A wiper system comprising:

the motor apparatus according to claim 1; and a wiper, which is directly or indirectly connected to the output shaft of the clutch device and is reciprocally swung at the time of reciprocally rotating the output shaft.

15. The wiper system according to claim 14, further comprising a motion converting mechanism that includes:

a worm gear, which is provided to a rotatable shaft of the motor main body to rotate integrally with the rotatable shaft;

a worm wheel, which is meshed with the worm gear and rotates about a rotational axis, which is perpendicular to an axis of the rotatable shaft; and a swing member, which has one end connected to the worm wheel at a position spaced from the rotational axis of the worm wheel and has the other end engaged with the first rotatable member of the clutch device, wherein the swing member is reciprocally swung by rotation of the worm wheel to reciprocally rotate the first rotatable member.

16. The wiper system according to claim 14, wherein a securing strength between the output shaft and the second rotatable member in a rotational direction of the output shaft is larger than a connecting strength of the wiper to the output shaft, which is directly connected to the wiper, in the rotational direction of the output shaft.

* * * * *